(12) United States Patent
Gutensohn et al.

(10) Patent No.: US 11,868,526 B2
(45) Date of Patent: Jan. 9, 2024

(54) METHOD AND DEVICE FOR DEBUGGING PROGRAM EXECUTION AND CONTENT PLAYBACK

(71) Applicant: Apple Inc., Cupertino, CA (US)

(72) Inventors: Michael J. Gutensohn, Rodeo, CA (US); Payal Jotwani, Santa Clara, CA (US); Mark E. Drummond, Palo Alto, CA (US); Daniel L. Kovacs, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 8 days.

(21) Appl. No.: 17/703,278

(22) Filed: Mar. 24, 2022

(65) Prior Publication Data

US 2022/0350401 A1 Nov. 3, 2022

Related U.S. Application Data

(60) Provisional application No. 63/183,188, filed on May 3, 2021.

(51) Int. Cl.
*G06F 3/01* (2006.01)

(52) U.S. Cl.
CPC .................................. *G06F 3/013* (2013.01)

(58) Field of Classification Search
None
See application file for complete search history.

(56) References Cited

U.S. PATENT DOCUMENTS

| | | | |
|---|---|---|---|
| 10,484,643 B2 | 11/2019 | Moran | |
| 10,558,264 B1 * | 2/2020 | Watson | H04N 13/156 |
| 10,720,184 B2 | 7/2020 | Anderson | |
| 2018/0246698 A1 * | 8/2018 | Huang | H04R 1/32 |
| 2020/0023276 A1 | 1/2020 | Chen et al. | |
| 2020/0310748 A1 | 10/2020 | Huang | |

* cited by examiner

*Primary Examiner* — Nicholas J Lee
(74) *Attorney, Agent, or Firm* — Fernando & Partners, LLP

(57) ABSTRACT

In one implementation, a method for recording an XR environment. The method includes: presenting, via the display device, a graphical environment with one or more virtual agents, wherein the graphical environment corresponds to a composition of extended reality (XR) content, including the one or more virtual agents, and an image stream of a physical environment captured from a first point-of-view (POV) of the physical environment; detecting, via the one or more input devices, a user input selecting a first virtual agent from among the one or more virtual agents; and in response to detecting the user input, recording a plurality of data streams associated with the graphical environment including a first image stream of the graphical environment from the first POV and one or more data streams of the graphical environment from a current POV of the first virtual agent.

22 Claims, 35 Drawing Sheets

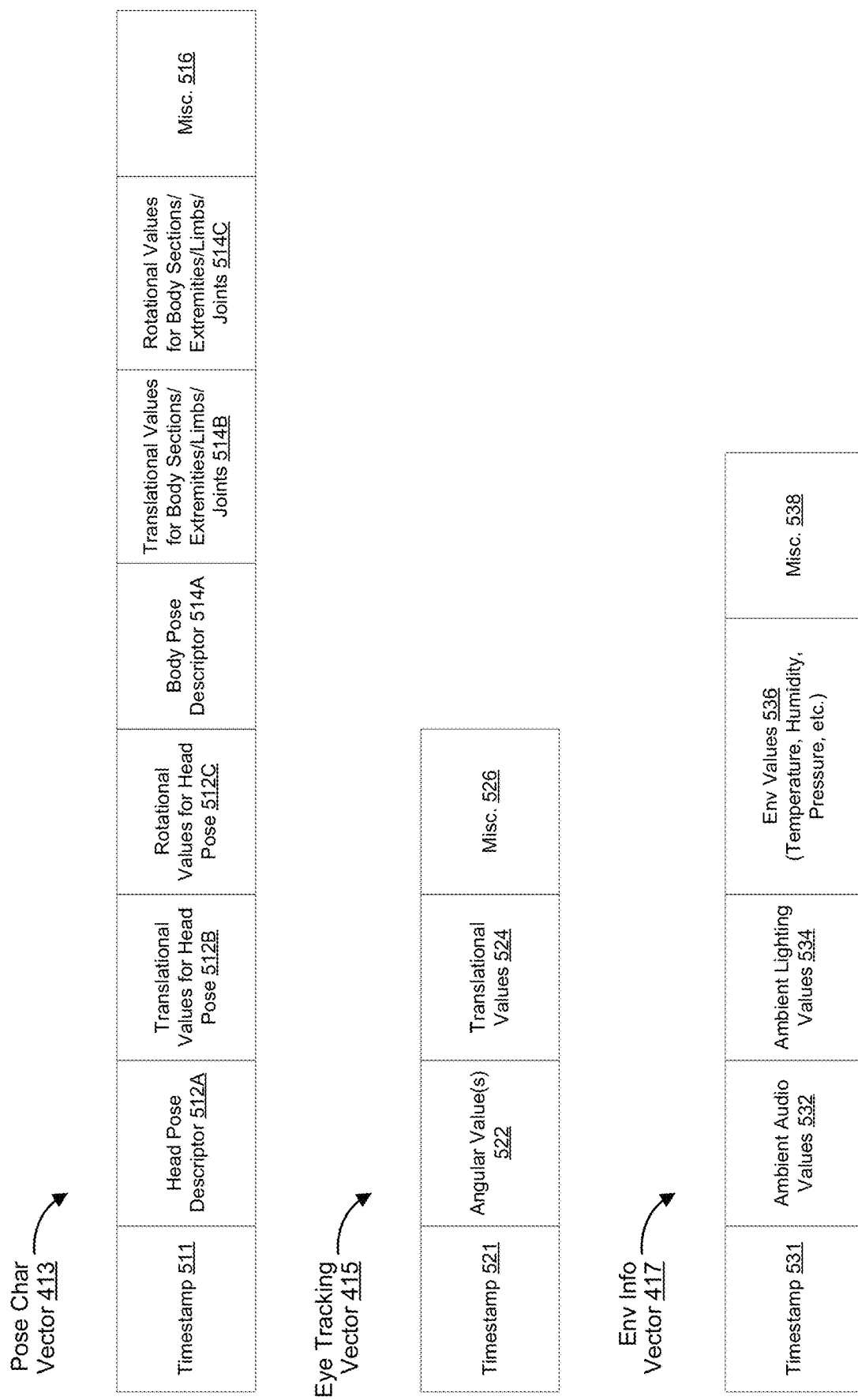

METHOD AND DEVICE FOR DEBUGGING PROGRAM EXECUTION AND CONTENT PLAYBACK

RELATED APPLICATION

This application claims priority to U.S. Provisional Patent Application No. 63/183,188, filed on May 3, 2021, the entire contents of which is incorporated herein by reference.

TECHNICAL FIELD

The present disclosure generally relates to debugging program execution and content playback and, in particular, to systems, methods, and methods for selective recordation and playback of extended reality (XR) environments.

BACKGROUND

Typically, an XR experience may be recorded whereby recorded video data includes a composition of both video pass-through data associated with a scene and XR data. This recorded video data may be insufficient when a developer intends to debug program execution and graphical content playback such as virtual agents (VAs) and/or the XR content.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 illustrates example data structures in accordance with some implementations.

Figure 1:
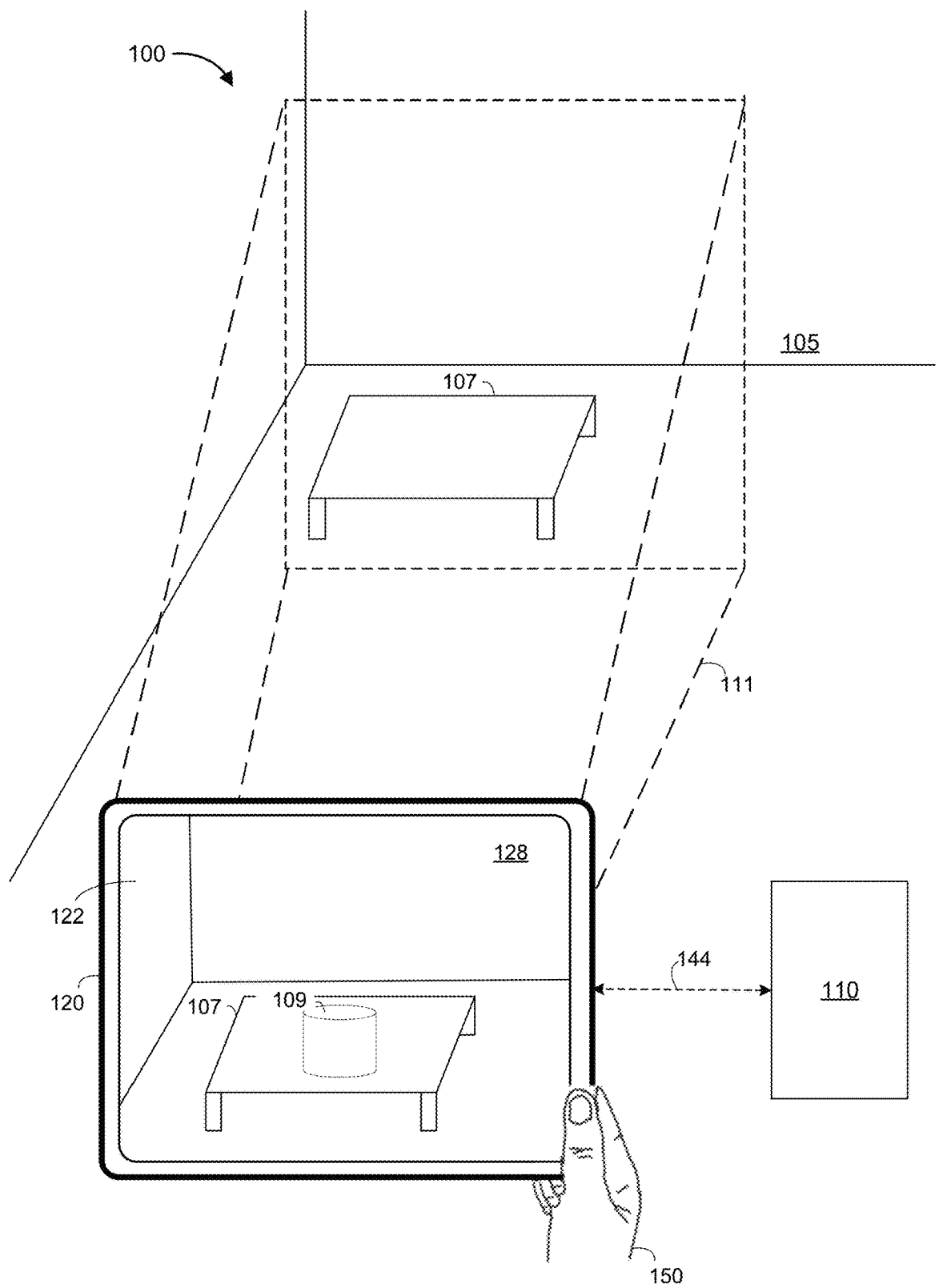
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for recording an XR environment. According to some implementations, the method is performed at a computing system including non-transitory memory and one or more processors, wherein the computing system is communicatively coupled to a display device and one or more input devices. The method includes: presenting, via the display device, a graphical environment with one or more virtual agents, wherein the graphical environment corresponds to a composition of extended reality (XR) content, including the one or more virtual agents, and an image stream of a physical environment captured from a first point-of-view (POV) of the physical environment; detecting, via the one or more input devices, a user input selecting a first virtual agent from among the one or more virtual agents; and in response to detecting the user input, recording a plurality of data streams associated with the graphical environment including a first image stream of the graphical environment from the first POV and one or more data streams of the graphical environment from a current POV of the first virtual agent.

Various implementations disclosed herein include devices, systems, and methods for playing back a record of an XR environment. According to some implementations, the method is performed at a computing system including non-transitory memory and one or more processors, wherein the computing system is communicatively coupled to a display device and one or more input devices. The method includes: selecting a previously recorded instance of a graphical environment including one or more virtual agents (VAs); in response to detecting the first user input, presenting the previously recorded instance of the graphical environment from a first point-of-view (POV) and presenting a plurality of controls associated with playback of the previously recorded instance of the graphical environment including user interface (UI) elements for changing from the first POV to a second POV and for activating one or more layers; detecting a second user input selecting a respective VA among the one or more VAs; and in response to detecting the second user input, presenting the previously recorded instance of the graphical environment from a second POV associated with the respective VA.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
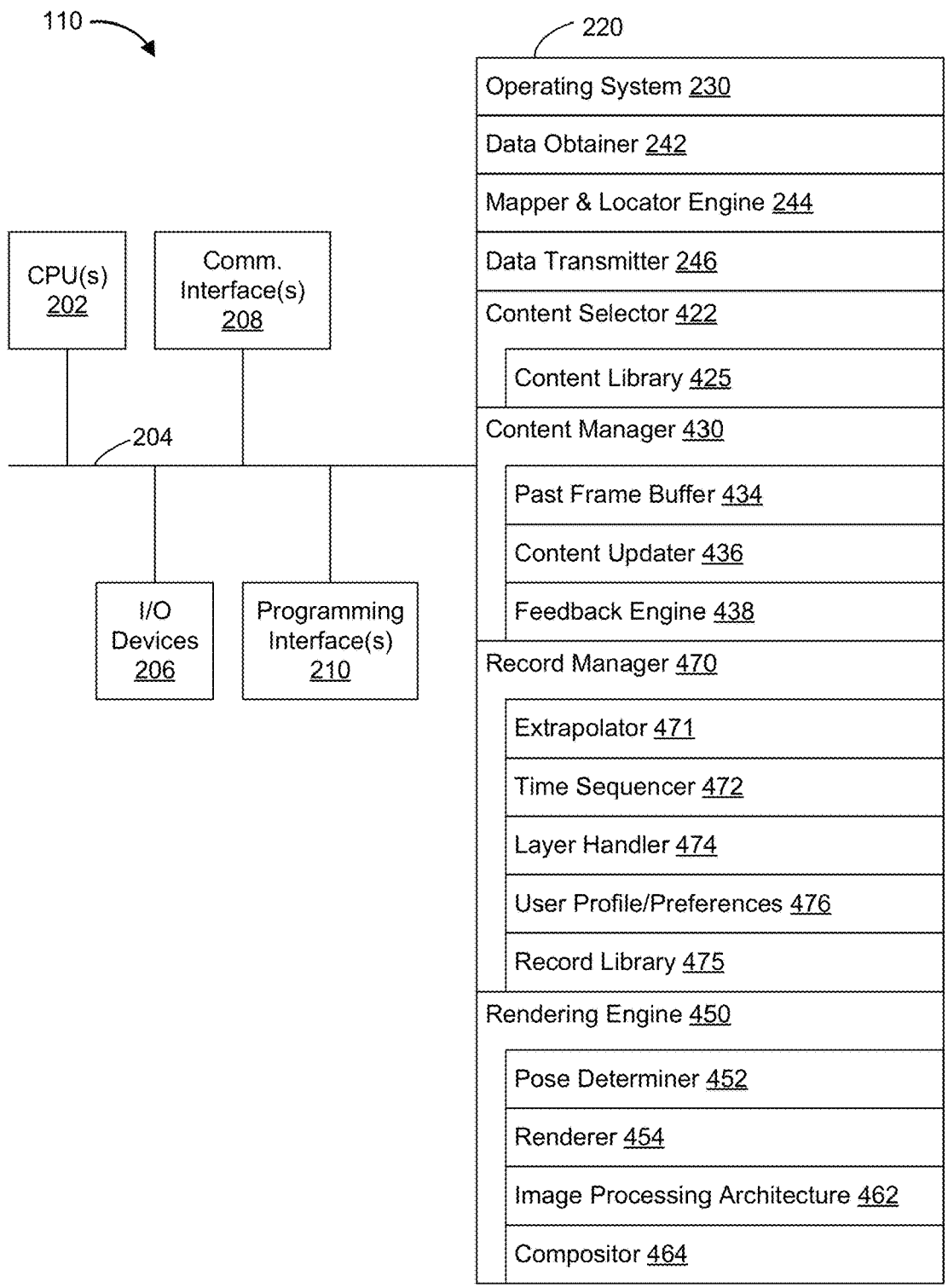
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a content selector 422 is configured to select XR content (sometimes also referred to herein as "graphical content" or "virtual content") and/or one or more virtual agents (VAs) from a content library 425 based on one or more user requests and/or user inputs (e.g., a voice command, a selection from a user interface (UI) menu of XR content items, and/or the like). The content selector 422 is described in more detail below with reference to FIG. 4A. To that end, in various implementations, the content selector 422 includes instructions and/or logic therefor, and heuristics and metadata therefor.

In some implementations, the content library 425 includes a plurality of content items such as audio/visual (A/V) content, VAs, and/or XR content, objects, items, scenery, etc. As one example, the XR content includes 3D reconstructions of user captured videos, movies, TV episodes, and/or other XR content. In some implementations, the content library 425 is pre-populated or manually authored by the user 150. In some implementations, the content library 425 is located local relative to the controller 110 and/or the electronic device 120. In some implementations, the content library 425 is located remote from the controller 110 and/or the electronic device 120 (e.g., at a remote server, a cloud server, or the like).

In some implementations, a content manager 430 is configured to manage and update the layout, setup, structure, and/or the like for the XR environment 128 including one or more of VAs, XR content, one or more user interface (UI) elements associated with the XR content, and/or the like. The content manager 430 is described in more detail below with reference to FIG. 4A. To that end, in various implementations, the content manager 430 includes instructions and/or logic therefor, and heuristics and metadata therefor. In some implementations, the content manager 430 includes a past frame buffer 434, a content updater 436, and a feedback engine 438. In some implementations, the past frame buffer 434 includes XR content, a rendered image frame, and/or the like for one or more past instances and/or frames.

In some implementations, the content updater 436 is configured to modify the XR environment 128 over time based on translational or rotational movement, user commands, user inputs, and/or the like. To that end, in various implementations, the content updater 436 includes instructions and/or logic therefor, and heuristics and metadata therefor.

In some implementations, the feedback engine 438 is configured to generate sensory feedback (e.g., visual feedback such as text or lighting changes, audio feedback, haptic feedback, etc.) associated with the XR environment 128. To that end, in various implementations, the feedback engine 438 includes instructions and/or logic therefor, and heuristics and metadata therefor.

In some implementations, a record manager 470 is configured to populate and manage a record library 475 including records associated with the XR environment 128. The record manager 470 is described in more detail below with reference to FIG. 4A. To that end, in various implementations, the record manager 470 includes instructions and/or logic therefor, and heuristics and metadata therefor. In some implementations, the record manager 470 includes an extrapolator 471, a time sequencer 472, a layer handler 474, a user profile or a set of user preferences 476, and a record library 475.

In some implementations, the extrapolator 471 is configured to fill data gaps in data streams associated with various sensory perceptions from the POVs of one or more VAs. The extrapolator 471 is described in more detail below with reference to FIG. 4A. To that end, in various implementations, the extrapolator 471 includes instructions and/or logic therefor, and heuristics and metadata therefor.

In some implementations, the time sequencer 472 is configured to temporally synchronize a plurality of data streams associated with a record. The time sequencer 472 is described in more detail below with reference to FIG. 4A. To that end, in various implementations, the time sequencer 472 includes instructions and/or logic therefor, and heuristics and metadata therefor.

In some implementations, the layer handler 474 is configured to enable and/or disable one or more layers associated with a record based on user commands and/or user inputs. The layer handler 474 is described in more detail below with reference to FIG. 4A. To that end, in various implementations, the layer handler 474 includes instructions and/or logic therefor, and heuristics and metadata therefor.

In some implementations, a user profile or a set of user preferences 476 includes recording modifiable preferences for a specific user such as record only layers A and B, record all layers, record all VAs and all VA sensory perceptions, and/or the like. In some implementations, the record library 475 includes a plurality of previously recorded instances of the XR environment 128. FIG. 4C illustrates an example record 480 within the record library 475. In some implementations, the record library 475 is located local relative to the controller 110 and/or the electronic device 120. In some implementations, the record library 475 is located remote from the controller 110 and/or the electronic device 120 (e.g., at a remote server, a cloud server, or the like).

In some implementations, a rendering engine 450 is configured to render an XR environment 128 (sometimes also referred to herein as a "graphical environment" or "virtual environment") or image frame associated therewith as well as the VAs, XR content, one or more UI elements associated with the XR content, and/or the like. To that end, in various implementations, the rendering engine 450 includes instructions and/or logic therefor, and heuristics and metadata therefor. In some implementations, the rendering engine 450 includes a pose determiner 452, a renderer 454, an optional image processing architecture 462, and an optional compositor 464. One of ordinary skill in the art will appreciate that the optional image processing architecture 462 and the optional compositor 464 may be present for video pass-through configuration but may be removed for fully VR or optical see-through configurations.

In some implementations, the pose determiner 452 is configured to determine a current camera pose of the electronic device 120 and/or the user 150 relative to the A/V content and/or the XR content. The pose determiner 452 is described in more detail below with reference to FIG. 4A. To that end, in various implementations, the pose determiner 452 includes instructions and/or logic therefor, and heuristics and metadata therefor.

In some implementations, the renderer 454 is configured to render the A/V content and/or the XR content according to the current camera pose relative thereto. The renderer 454 is described in more detail below with reference to FIG. 4A. To that end, in various implementations, the renderer 454 includes instructions and/or logic therefor, and heuristics and metadata therefor.

In some implementations, the image processing architecture 462 is configured to obtain (e.g., receive, retrieve, or capture) an image stream including one or more images of the physical environment 105 from the current camera pose of the electronic device 120 and/or the user 150. In some implementations, the image processing architecture 462 is also configured to perform one or more image processing operations on the image stream such as warping, color correction, gamma correction, sharpening, noise reduction, white balance, and/or the like. The image processing architecture 462 is described in more detail below with reference to FIG. 4A. To that end, in various implementations, the image processing architecture 462 includes instructions and/or logic therefor, and heuristics and metadata therefor.

In some implementations, the compositor 464 is configured to composite the rendered A/V content and/or XR content with the processed image stream of the physical environment 105 from the image processing architecture 462 to produce rendered image frames of the XR environment 128 for display. The compositor 464 is described in more detail below with reference to FIG. 4A. To that end, in various implementations, the compositor 464 includes instructions and/or logic therefor, and heuristics and metadata therefor.

Although the data obtainer 242, the mapper and locator engine 244, the data transmitter 246, the content selector 422, the content manager 430, the record manager 470, and the rendering engine 450 are shown as residing on a single device (e.g., the controller 110), it should be understood that in other implementations, any combination of the data obtainer 242, the mapper and locator engine 244, the data transmitter 246, the content selector 422, the content manager 430, the record manager 470, and the rendering engine 450 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
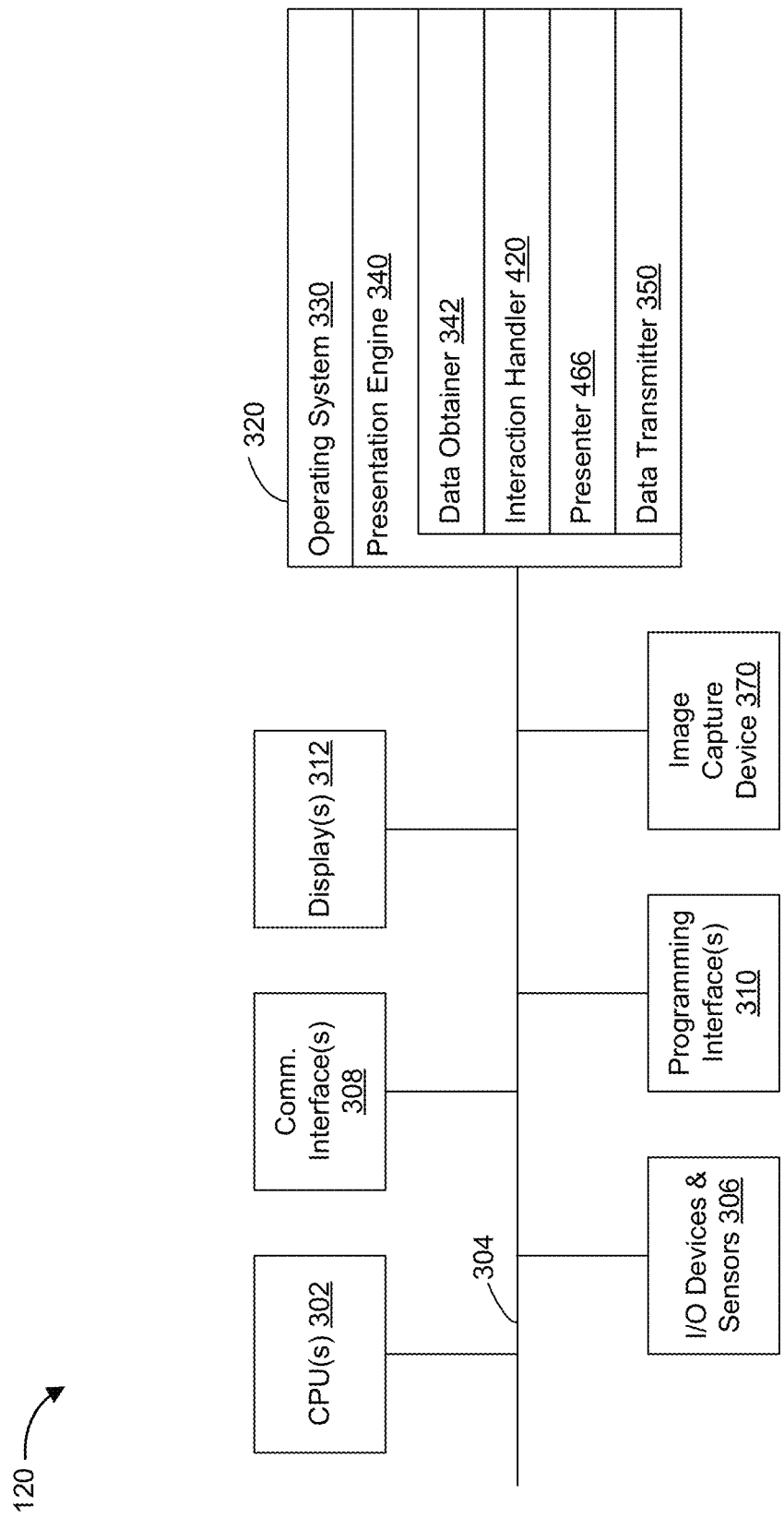
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 466, an interaction handler 420, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 420 is configured to detect user interactions with the presented A/V content and/or XR content (e.g., gestural inputs detected via hand tracking, eye gaze inputs detected via eye tracking, voice commands, etc.). To that end, in various implementations, the interaction handler 420 includes instructions and/or logic therefor, and heuristics and metadata therefor.

In some implementations, the presenter 466 is configured to present and update A/V content and/or XR content (e.g., the rendered image frames associated with the user interface or the XR environment 128 including the XR content, one or more UI elements associated with the XR content, and a focus indicator in association with one of the one or more UI elements) via the one or more displays 312. To that end, in various implementations, the presenter 466 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 420, the presenter 466, and the data transmitter 350 are shown as residing on a single device (e.g., the electronic device 120), it should be understood that in other implementations, any combination of the data obtainer 342, the interaction handler 420, the presenter 466, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
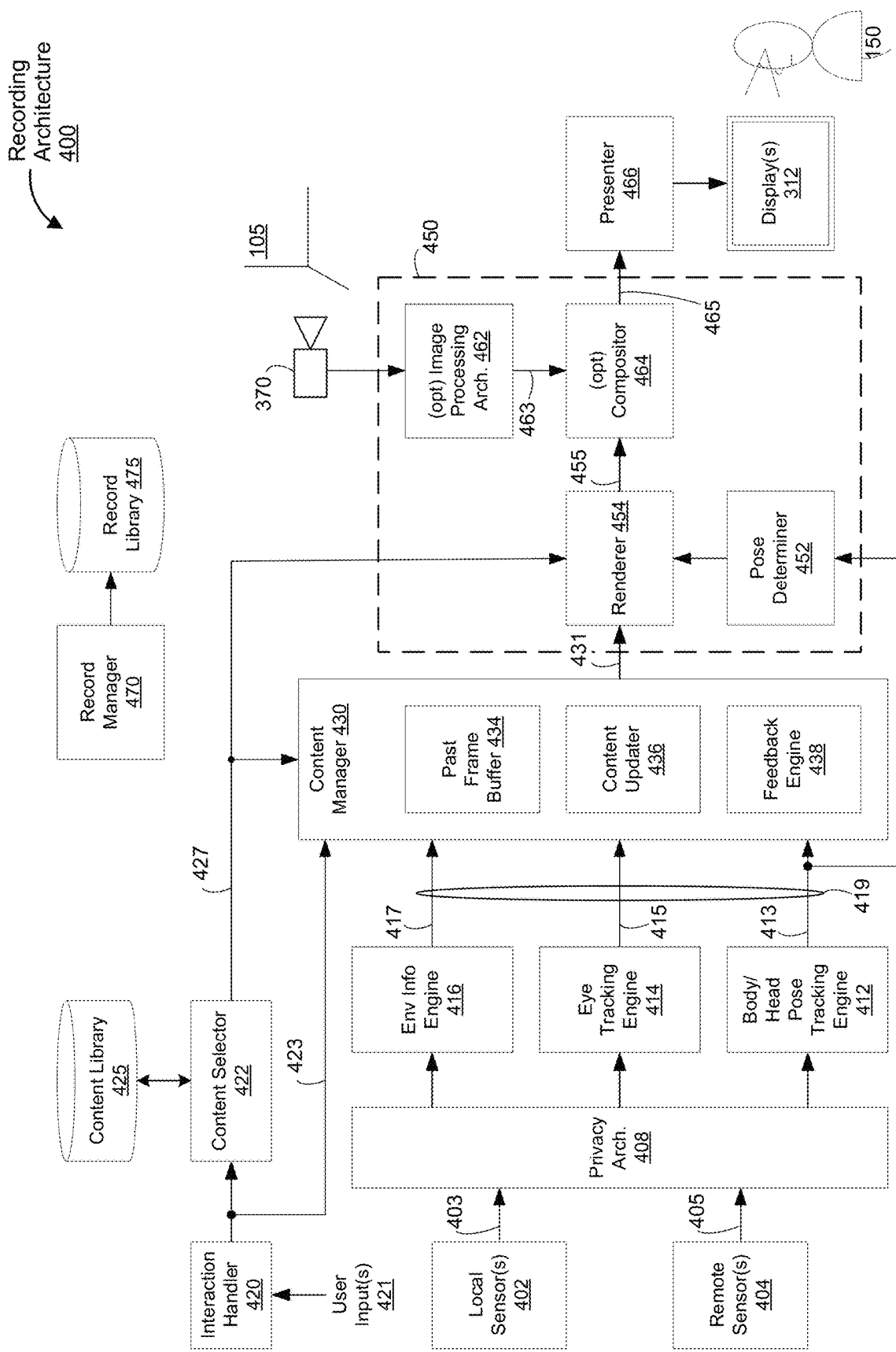
FIG. 4A is a block diagram of an example recording architecture in accordance with some implementations.

FIG. 4A is a block diagram of an example recording architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the recording architecture 400 is included in a computing system such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4A, one or more remote sensors 404 associated with the optional remote input devices within the physical environment 105 obtain remote sensor data 405 associated with the physical environment 105. For example, the remote sensor data 405 includes images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits content delivery architecture 400 or portions thereof from obtaining and/or transmitting the user information. To this end, the privacy architecture 408 receives user preferences and/or selections from the user 150 in response to prompting the user 150 for the same. In some implementations, the privacy architecture 408 prevents the content delivery architecture 400 from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the body/head pose tracking engine 412 obtains the local sensor data 403 and the remote sensor data 405 after it has been subjected to the privacy architecture 408. In some implementations, the body/head pose tracking engine 412 determines a pose characterization vector 413 based on the input data and updates the pose characterization vector 413 over time. In some implementations, the body/head pose tracking engine 412 also performs hand/extremity tracking.

FIG. 5 shows an example data structure for the pose characterization vector 413 in accordance with some implementations. As shown in FIG. 5, the pose characterization vector 413 may correspond to an N-tuple characterization vector or characterization tensor that includes a timestamp 511 (e.g., the most recent time the pose characterization vector 413 was updated), a head pose descriptor 512A (e.g., upward, downward, neutral, etc.), translational values for the head pose 512B, rotational values for the head pose 512C, a body pose descriptor 514A (e.g., standing, sitting, prone, etc.), translational values for body sections/extremities/limbs/joints 514B, rotational values for the body sections/extremities/limbs/joints 514C, and/or miscellaneous information 516. In some implementations, the pose characterization vector 413 also includes information associated with hand/extremity tracking. One of ordinary skill in the art will appreciate that the data structure for the pose characterization vector 413 in FIG. 5 is merely an example that may include different information portions in various other implementations and be structured in myriad ways in various other implementations.

According to some implementations, the eye tracking engine 414 obtains the local sensor data 403 and the remote sensor data 405 after it has been subjected to the privacy architecture 408. In some implementations, the eye tracking engine 414 determines an eye tracking vector 415 based on the input data and updates the eye tracking vector 415 over time.

FIG. 5 shows an example data structure for the eye tracking vector 415 in accordance with some implementations. As shown in FIG. 5, the eye tracking vector 415 may correspond to an N-tuple characterization vector or characterization tensor that includes a timestamp 521 (e.g., the most recent time the eye tracking vector 415 was updated), one or more angular values 522 for a current gaze direction, one or more translational values 524 for the current gaze direction, and/or miscellaneous information 526. One of ordinary skill in the art will appreciate that the data structure for the eye tracking vector 415 in FIG. 5 is merely an example that may include different information portions in various other implementations and be structured in myriad ways in various other implementations.

For example, the gaze direction indicates a point (e.g., associated with x, y, and z coordinates relative to the physical environment 105 or the world at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the environmental information engine 416 obtains the local sensor data 403 and the remote sensor data 405 after it has been subjected to the privacy architecture 408. In some implementations, the environmental information engine 416 determines an environmental information vector 417 based on the input data and updates the environmental information vector 417 over time.

FIG. 5 shows an example data structure for the environmental information vector 417 in accordance with some implementations. As shown in FIG. 5, the environmental information vector 417 may correspond to an N-tuple characterization vector or characterization tensor that includes a timestamp 531 (e.g., the most recent time the environmental information vector 417 was updated), one or more ambient audio values 532, one or more ambient lighting values 534, one or more environmental values 536 (e.g., temperature, humidity, pressure, etc.), and/or miscellaneous information 538. One of ordinary skill in the art will appreciate that the data structure for the environmental information vector 417 in FIG. 5 is merely an example that may include different information portions in various other implementations and be structured in myriad ways in various other implementations.

According to some implementations, the interaction handler 420 obtains (e.g., receives, retrieves, or detects) one or more user inputs 421 provided by the user 150 that are associated with selecting A/V content, VAs, and/or XR content for presentation. For example, the one or more user inputs 421 correspond to a gestural input selecting XR content from a UI menu detected via hand tracking, an eye gaze input selecting XR content from the UI menu detected via eye tracking, a voice command selecting XR content from the UI menu detected via a microphone, and/or the like. In some implementations, the content selector 422 selects XR content or VA(s) 427 from the content library 425 based on one or more user inputs 421 (e.g., a voice command, a selection from a menu of XR content items, and/or the like). In some implementations, the interaction handler 420 obtains (e.g., receives, retrieves, or detects) one or more user inputs 421 provided by the user 150 that are associated with manipulating or otherwise modifying the presented A/V content, VAs, XR content, UI elements, and/or the like.

In various implementations, the content manager 430 manages and updates the layout, setup, structure, and/or the like for the XR environment 128 including one or more of VAs, XR content, one or more UI elements associated with the XR content, and/or the like. To that end, the content manager 430 includes the past frame buffer 434, the content updater 436, and the feedback engine 438.

In some implementations, the past frame buffer 434 includes XR content, a rendered image frame, and/or the like for one or more past instances and/or frames. In some implementations, the content updater 436 modifies the XR environment 128 over time based on the sensor inputs 419 (i.e., a collection of the vectors 413, 415, and 417), unprocessed user inputs 423 associated with modifying the XR content or VA(s), translational or rotational movement of objects within the physical environment 105, translational or rotational movement of the electronic device 120 (or the user 150), and/or the like. In some implementations, the feedback engine 438 generates sensory feedback (e.g., visual feedback such as text or lighting changes, audio feedback, haptic feedback, etc.) associated with the XR environment 128.

According to some implementations, the pose determiner 452 determines a current camera pose of the electronic device 120 and/or the user 150 relative to the XR environment 128 and/or the physical environment 105 based at least in part on the sensor inputs 419 (i.e., the collection of the vectors 413, 415, and 417). In some implementations, the renderer 454 renders the selected XR content or VAs 427, one or more UI elements associated with the XR content, and/or the like according to the current camera pose relative thereto.

According to some implementations, the optional image processing architecture 462 obtains an image stream from the image capture device 370 including one or more images of the physical environment 105 from the current camera pose of the electronic device 120 and/or the user 150. In some implementations, the image processing architecture 462 also performs one or more image processing operations on the image stream such as warping, color correction, gamma correction, sharpening, noise reduction, white balance, and/or the like. In some implementations, the optional compositor 464 composites the rendered XR content with the processed image stream of the physical environment 105 from the image processing architecture 462 to produce rendered image frames of the XR environment 128. In various implementations, the presenter 466 presents the rendered image frames of the XR environment 128 to the user 150 via the one or more displays 312. One of ordinary skill in the art will appreciate that the optional image processing architecture 462 and the optional compositor 464 may not be applicable for fully virtual environments (or optical see-through scenarios).

Figure 4B:
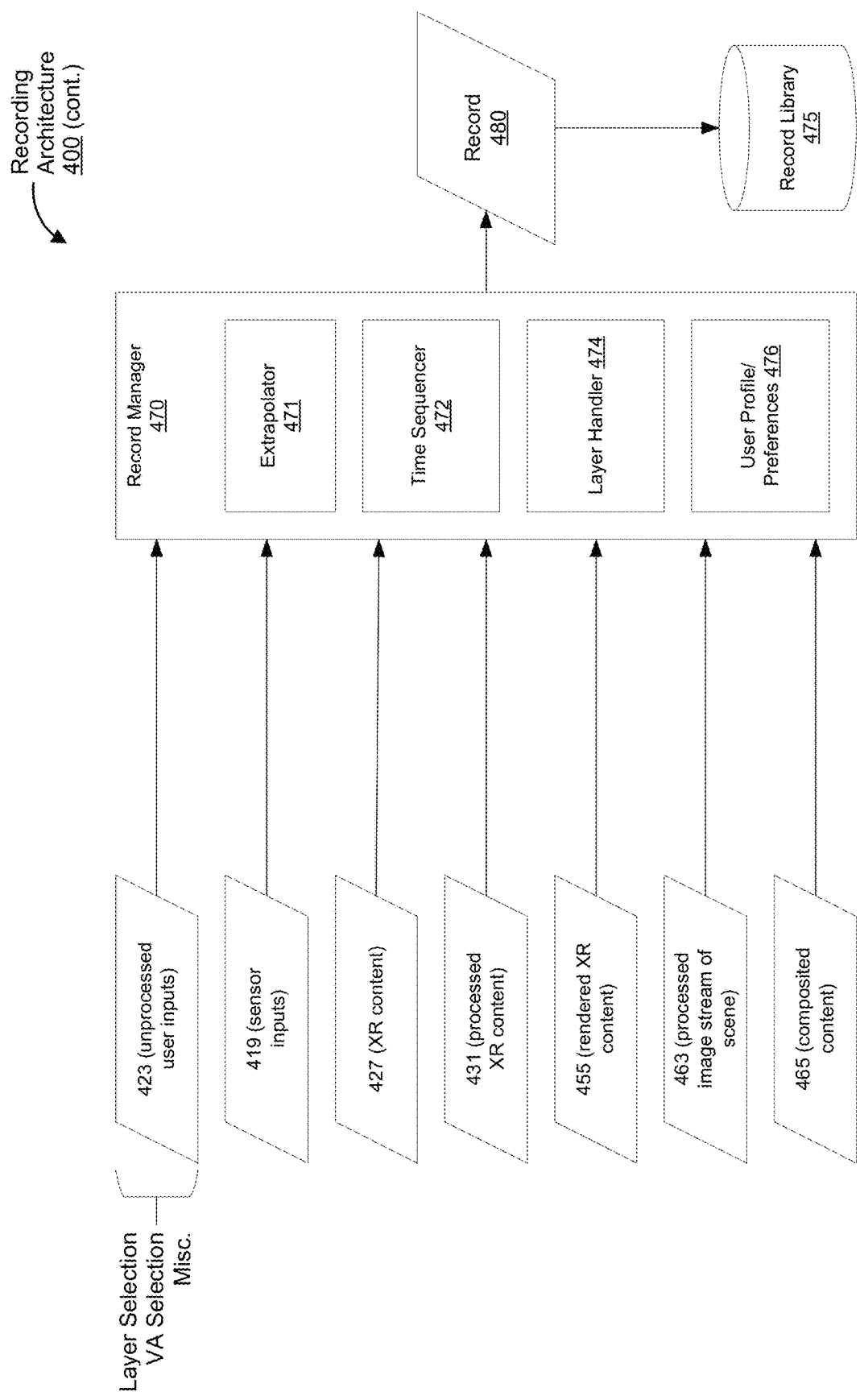
FIG. 4B is a block diagram of an example portion of the recording architecture in FIG. 4A in accordance with some implementations.
Figure 4C:
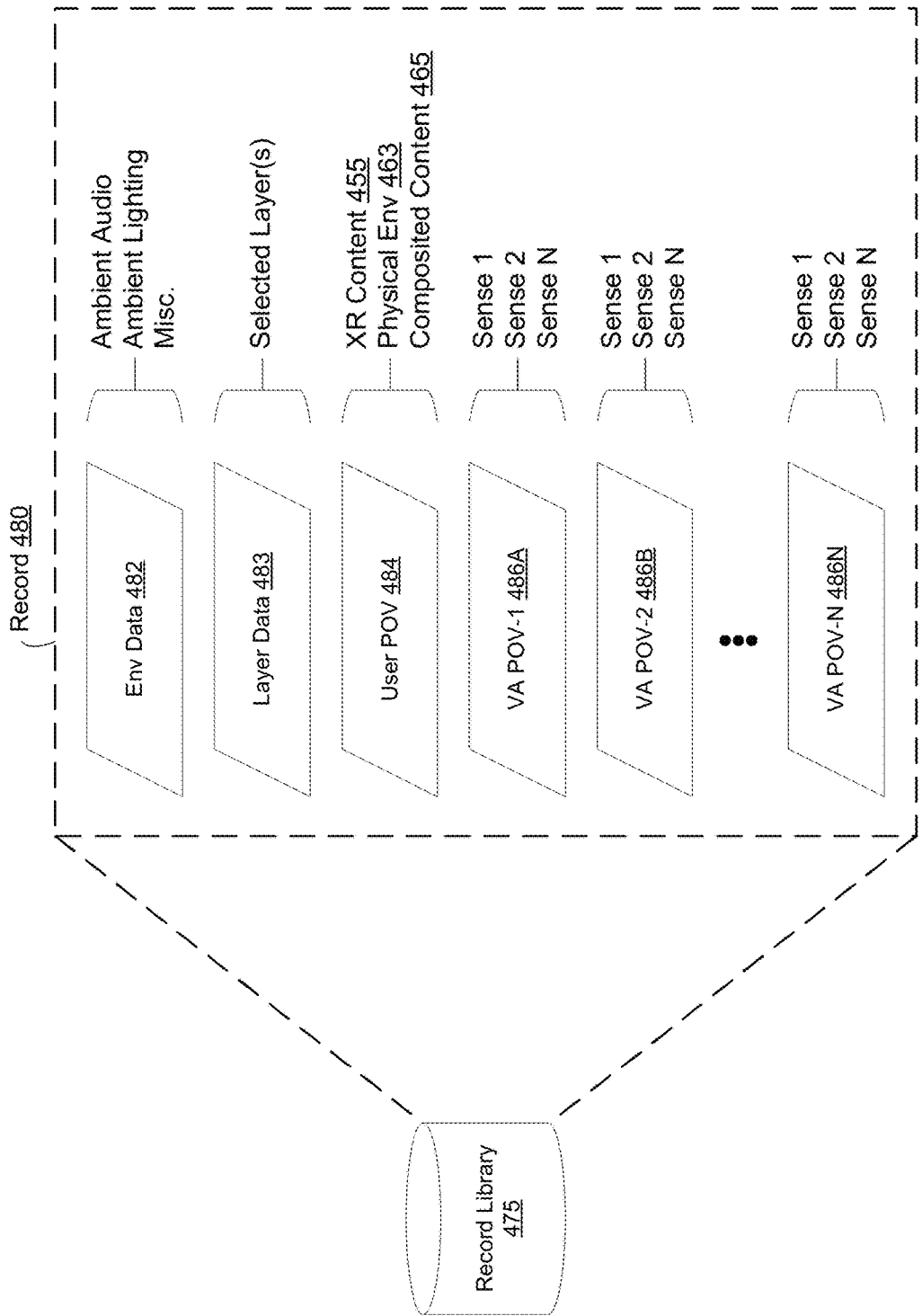
FIG. 4C illustrates an example data structure for a record library in accordance with some implementations.

In some implementations, the record manager 470 populates and manages the record library 475. In some implementations, the record manager 470 populates the record 480 based at least in part on the user profile/preferences 476 (e.g., record only layers A and B, record all layers, record all VAs and all VA sensory perceptions, and/or the like). As shown in FIG. 4B, the record manager 470 ingests at least some of the following content: unprocessed user inputs 423 (e.g., one or more layer selection inputs, VA selection inputs, layer selection inputs, XR content selection inputs, and/or the like); sensor inputs 419 (i.e., the collection of the vectors 413, 415, and 417); the selected XR content or VA(s) 427; processed XR content 431; rendered XR content 455; a processed image stream 463 of the physical environment 105; and composited content 465 (e.g., the rendered image frames of the XR environment 128). In FIG. 4B, the record manager generates a record 480 for future playback based on the ingested content and stores the record 480 in the record library 475.

As shown in FIG. 4C, the record 480 includes: environmental data 482 (e.g., ambient audio information, ambient lighting information, and/or the like similar to the environmental information vector 417 in FIG. 4A); layer data 483 (e.g., data streams associated with various layers); one or more data streams associated with a user POV 484 (e.g., the processed image stream 463 of the physical environment 105, the rendered XR content 455, the composited content 465, etc.); one or more streams associated with a POV of a first VA referred to herein as VA POV-1 486A (e.g., data streams associated with various sensory perceptions such as sense-1, sense-2, . . . , sense-N); more streams associated with a POV of a second VA referred to herein as VA POV-2 486B (e.g., data streams associated with various sensory perceptions such as sense-1, sense-2, . . . , sense-N); and one or more streams associated with a POV of an N-th VA referred to herein as VA POV-N 486N (e.g., data streams associated with various sensory perceptions such as sense-1, sense-2, . . . , sense-N).

In one example, the layer data 483 includes one or more data streams associated with different layers that have been toggled on during recordation based on user inputs 421. Continuing with this example, FIG. 6E illustrates a menu 652 for toggling layers during recordation. In another example, the one or more streams associated with the POV of the first VA referred to herein as the VA POV-1 486A correspond to different sensory modalities that have been toggled on during recordation based on user inputs 421. Continuing with this example, FIG. 6D illustrates a menu 642 for toggling sensory modalities during recordation.

According to some implementations, the senses for a respective VA correspond to different sensory perceptions or sensory modalities as defined by a perception profile for the respective VA. For example, a particular VA may have senses associated with visible wavelengths perception, infrared wavelengths perception, olfactory perception, auditory perception, and/or the like. In some implementations, each VA is associated with a predefined perception profile that includes its sensory modalities as well as acuity values or parameters for its sensory modalities (e.g., 20/20 vision, a sensitivity value for an olfactory perception, a frequency range for auditory perception, etc.). One of ordinary skill in the art will appreciate that VAs may have varying perception profiles with myriad different sensory modalities as well as associated acuity values in various implementations.

As shown in FIG. 4C, the record 480 includes a plurality of data streams including the rendered XR content 455 from the POV of the electronic device 120 or the user 150, the processed image stream 463 of the physical environment 105, the composited content 465, and one or more data streams associated with various sensory perceptions from the POV of at least one VA. In some implementations, the time sequencer 472 temporally synchronizes the plurality of data streams associated with the record 480. In some implementations, the extrapolator 471 fills data gaps in the one or more data streams associated with the various sensory perceptions from the POV(s) of the VA(s). In some implementations, the layer handler 474 enables or disables one or more layers based on the unprocessed user inputs 423 toggling the one or more layers.

As shown in FIG. 4C, the record library 475 includes a plurality of previously recorded instances of the XR environment 128 including at least the record 480. In some implementations, the record library 475 is located local relative to the controller 110 and/or the electronic device 120. In some implementations, the record library 475 is located remote from the controller 110 and/or the electronic device 120 (e.g., at a remote server, a cloud server, or the like).

Figure 4D:
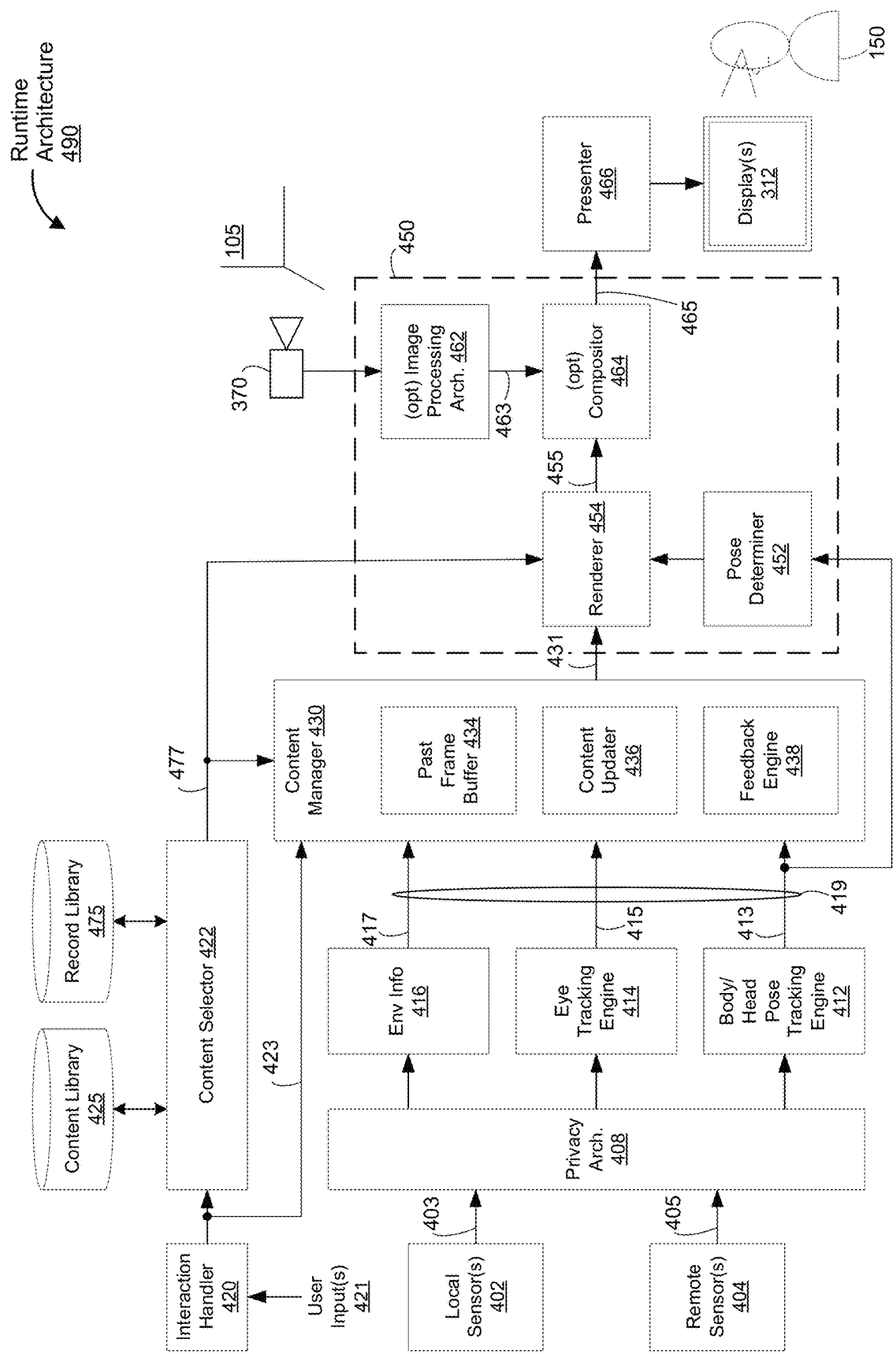
FIG. 4D is a block diagram of an example runtime architecture in accordance with some implementations.

FIG. 4D is a block diagram of an example runtime architecture 490 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the runtime architecture 490 is included in a computing system such as the controller 110 shown in FIGS. 1 and 2; the electronic device 120 shown in FIGS. 1 and 3; and/or a suitable combination thereof. The runtime architecture 490 in FIG. 4D are similar to and adapted from the recording architecture 400 in FIG. 4A. As such, similar references numbers are used in FIGS. 4A and 4D. Furthermore, only the differences between FIGS. 4A and 4D are described below for the sake of brevity. In some implementations, the runtime architecture 490 lacks the record manager 470.

In some implementations, the content selector 422 selects content 477 from the content library 425 and/or the record library 480 based on one or more user inputs 421 (e.g., a voice command, a selection from a menu based on a hand tracking input or a touch input on the display 122, and/or the like). As one example, the selected content 477 includes XR content or VAs from the content library 425. As another example, the selected content 477 includes a previously recorded instance of the XR environment 128 (e.g., the record 480) from the record library 475. As yet another example, the selected content 477 includes XR content or VAs from the content library 425 and a previously recorded instance of the XR environment 128 (e.g., the record 480) from the record library 475.

FIGS. 6A-6F illustrate a sequence of instances 610-650 and 660 for a recording scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 610-650 are rendered and presented by a computing system such as the controller 110 shown in FIGS. 1 and 2; the electronic device 120 shown in FIGS. 1 and 3; and/or a suitable combination thereof.

As shown in FIGS. 6A-6E, the recording scenario includes a physical environment 105 and an XR environment 128 displayed on the display 122 of the electronic device 120 (e.g., associated with the user 150). The electronic device 120 presents the XR environment 128 to the user 150 while the user 150 is physically present within the physical environment 105 that includes a door 115, which is currently within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 on the display 122 (e.g., the door 115). For example, the electronic device 120 corresponds to a mobile phone, tablet, laptop, near-eye system, wearable computing device, or the like.

Figure 6A:
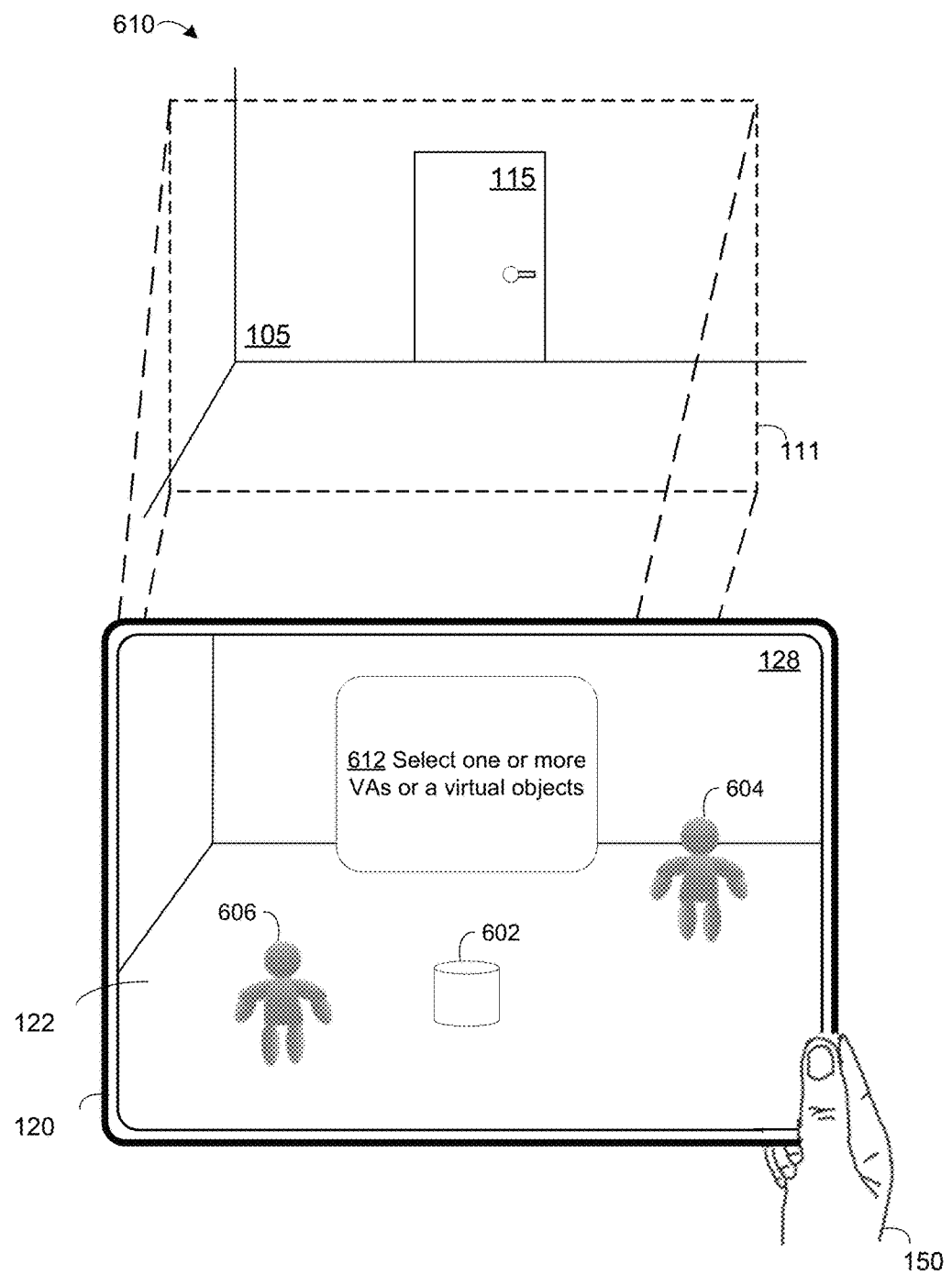
FIGS. 6A-6F illustrate a sequence of instances for a recording scenario in accordance with some implementations.

As shown in FIG. 6A, during the instance 610 (e.g., associated with time $T_1$) of the recording scenario, the electronic device 120 presents an XR environment 128 including XR content 602 (e.g., a 3D cylinder) and virtual agents 604 and 606. As shown in FIG. 6A, the XR environment 128 includes a text box 612 associated with inducing the user 150 to record a VA POV of the XR environment 128 (e.g., "Select one or more VAs or virtual objects" to record). One of ordinary skill in the art will appreciate that the text box 612 is merely an example notification and that the electronic device 120 may present various other notification visualizations or notification modalities such as haptic feedback, audible notifications, and/or the like.

Figure 6B:
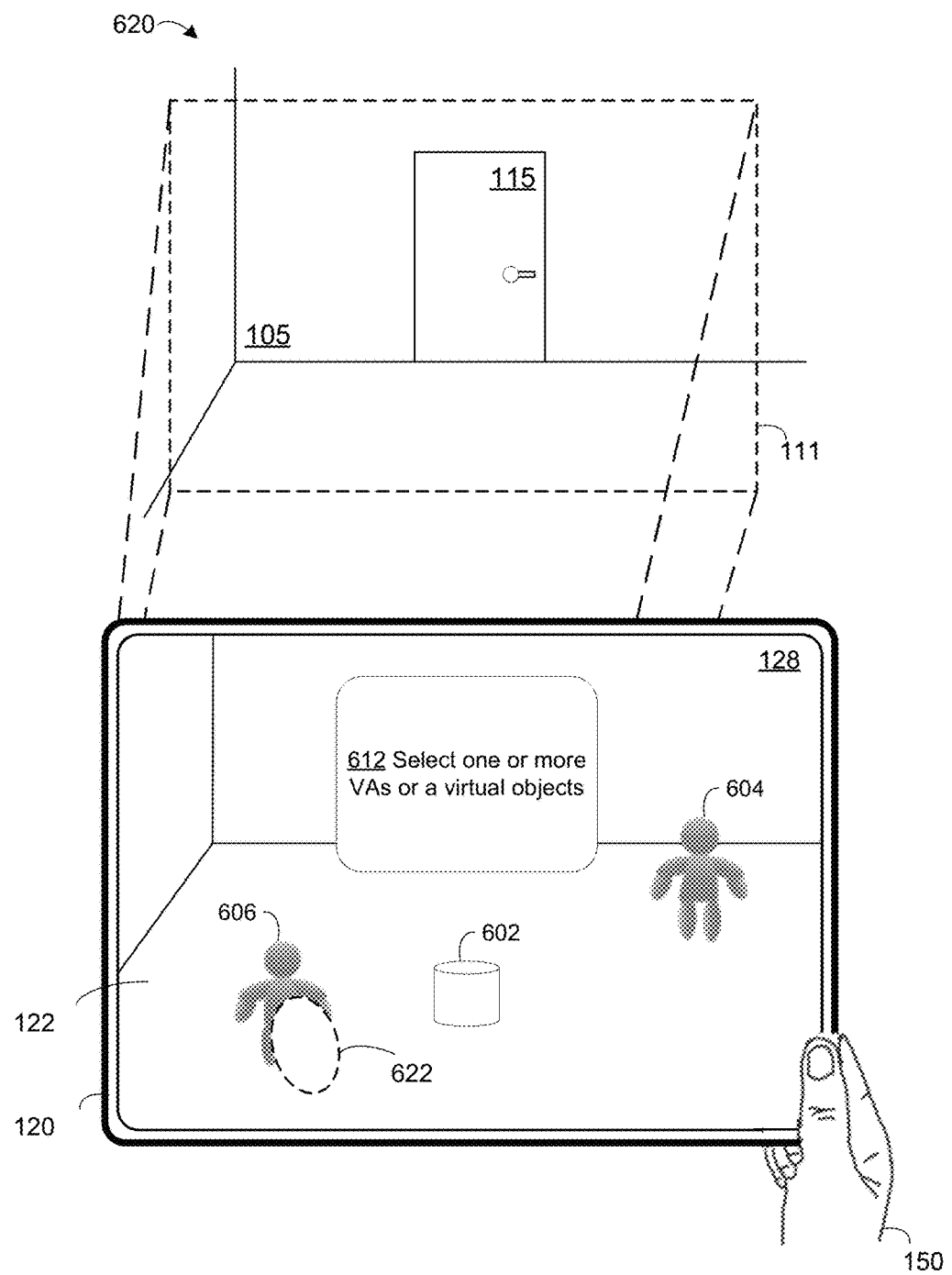

As shown in FIG. 6B, during the instance 620 (e.g., associated with time $T_2$) of the recording scenario, the electronic device 120 detects a user input 622 (e.g., a single or double-tap gesture on the display 122) at a location that corresponds to the VA 606 within the XR environment 128. One of ordinary skill in the art will appreciate that the user input 622 is merely an example user input and that the electronic device 120 may detect various other input modalities such as voice commands, hand tracking inputs, and/or the like.

Figure 6C:
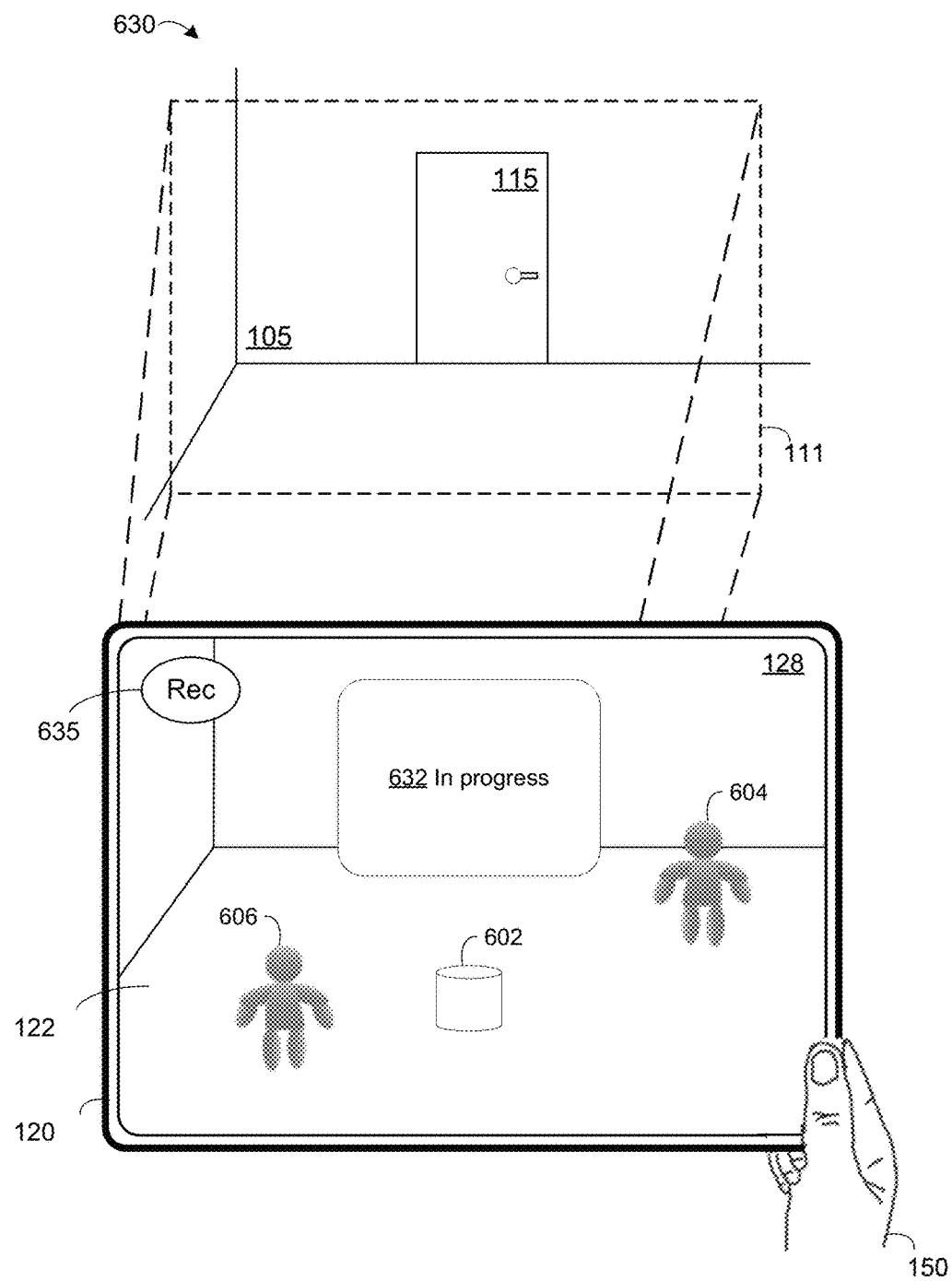
Figure 6D:
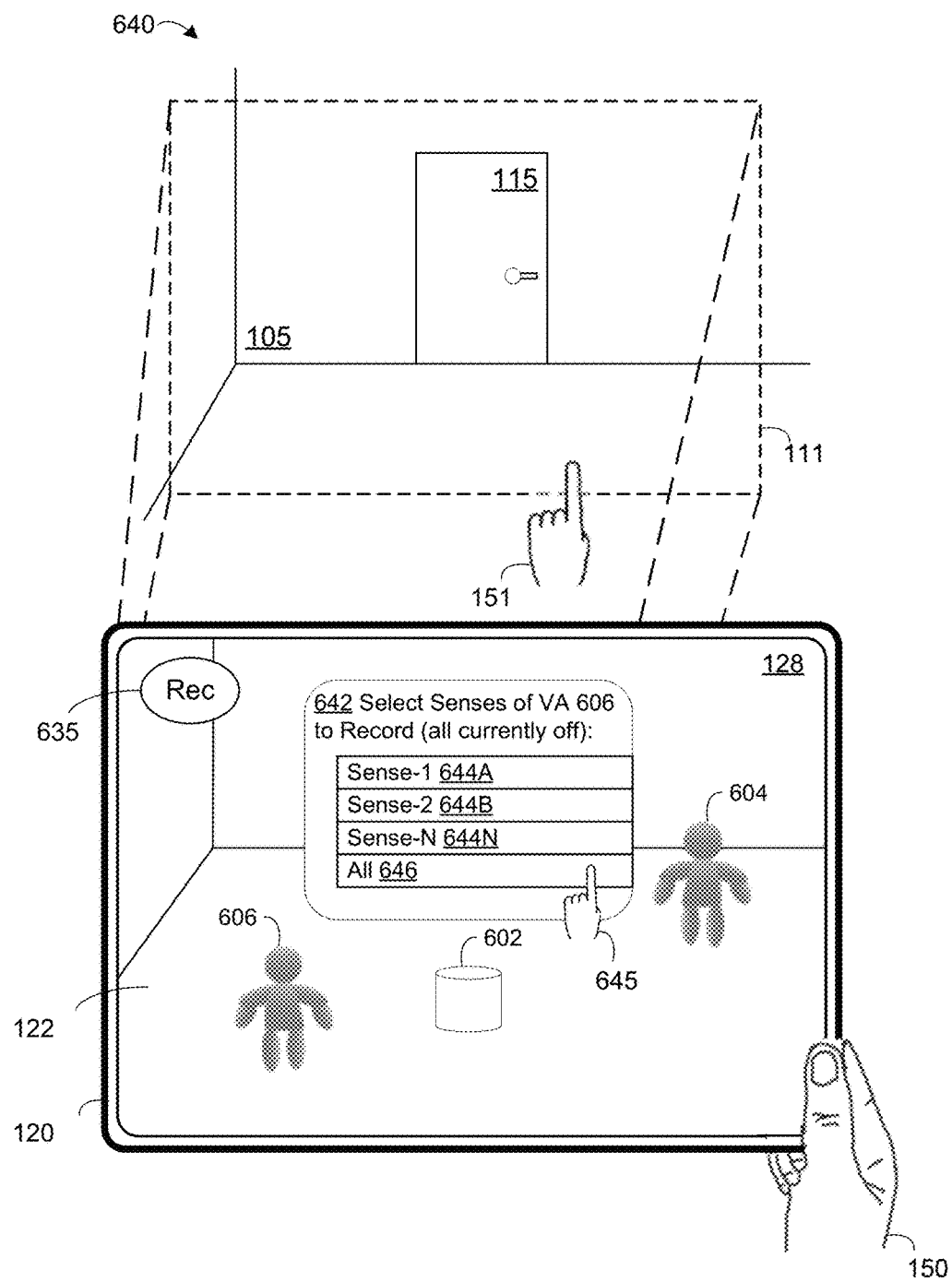
Figure 6E:
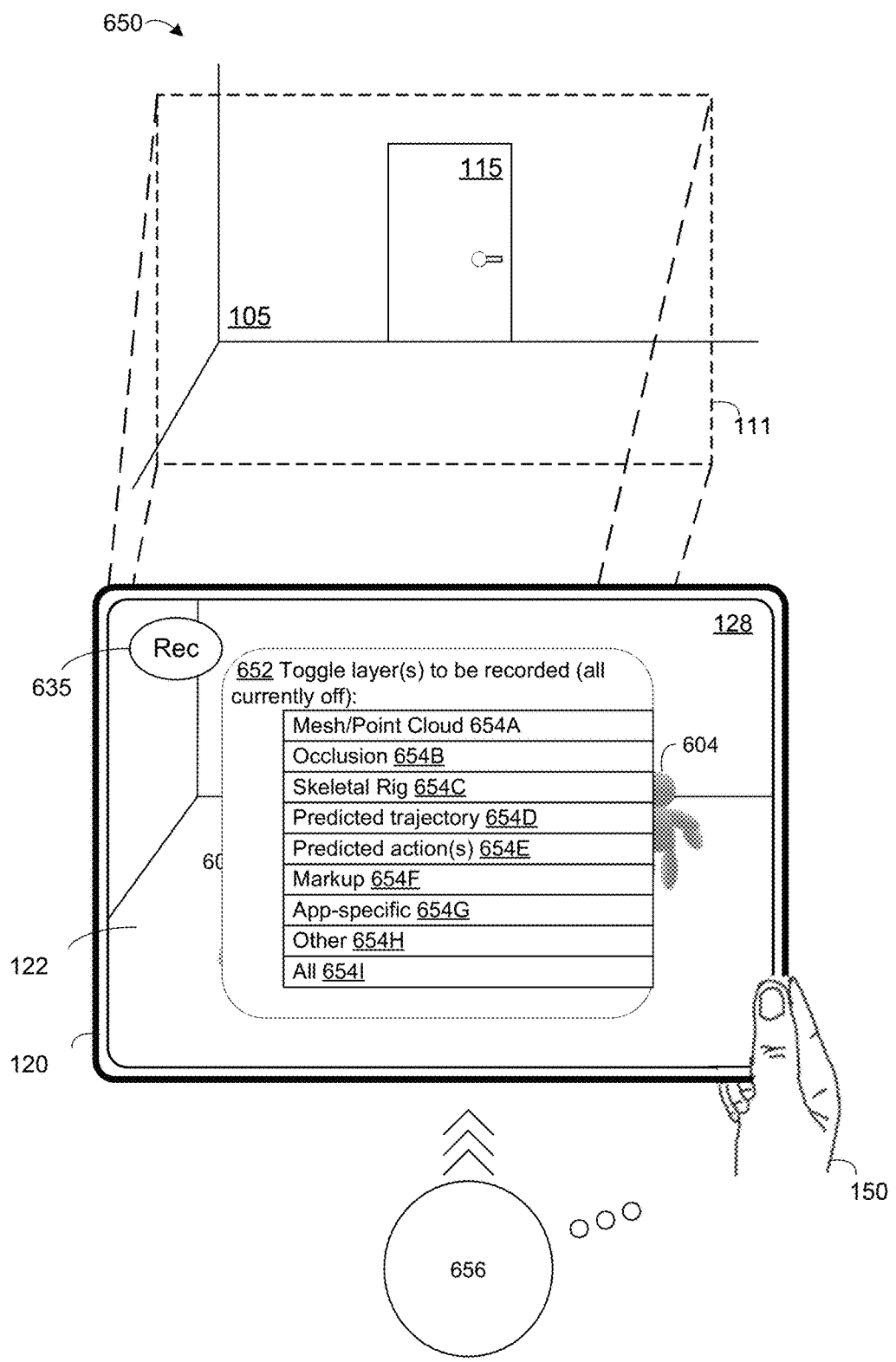

As shown in FIG. 6C, during the instance 630 (e.g., associated with time $T_3$) of the recording scenario, the electronic device 120 presents the XR environment 128 including a text box 632 associated with confirming the recording of the current POV of the VA 606 of the XR environment 128 (e.g., recording "In progress" for the POV of the VA 606) in response to detecting the user input 622 in FIG. 6B. One of ordinary skill in the art will appreciate that the text box 632 is merely an example notification and that various other visualizations or notification modalities may be presented to the user. One of ordinary skill in the art will appreciate that the text box 632 is merely an example notification and that the electronic device 120 may present various other notification visualizations or notification modalities such as haptic feedback, audible notifications, and/or the like.

During the recording scenario in FIGS. 6C-6F, the electronic device 120 also displays a recording indicator 635 (e.g., an icon, a badge, text, and/or the like) while recording. In some implementations, the recording indicator 635 may also be displayed to other users, if any, involved in the XR experience (sometimes also referred to herein as an "XR session"). One of ordinary skill in the art will appreciate that the recording indicator 635 is merely an example visualization that may be modified or replaced in various other some implementations.

As shown in FIG. 6D, during the instance 640 (e.g., associated with time $T_4$) of the recording scenario, the electronic device 120 presents the XR environment 128 including a menu 642 associated with sensory modalities of the VA 606. As one example, the electronic device 120 presents the menu 642 within the XR environment 128 in response to detecting a speech input from the user 150 associated with toggling sensory modalities. In FIG. 6D, the menu 642 includes a plurality of selectable options associated with different senses of the VA 606 that may be toggled on or off such as sense-1 644A, sense-2 644B, sense-N 644N, and all senses 646. For example, the plurality of selectable options within the menu 642 may be selected by various input modalities such as a tap/touch input on the display 122, a hand tracking input, a voice command, or the like.

As shown in FIG. 6D, during the instance 640 (e.g., associated with time $T_4$) of the recording scenario, the electronic device 120 detects, via the body/head pose tracking engine 412, a gestural input with a left hand 151 of the user 150 associated with selecting the option 646 within the menu 642. In FIG. 6D, the electronic device 120 presents a representation 645 of the left hand 151 of the user 150 within the XR environment 128. In response to detecting the gestural input with the left hand 151, the electronic device 120 records a plurality of data streams from the current POV of the VA 606 within the XR environment 128, wherein each of the plurality of data streams is associated with a different sense (e.g., a sensory perception or sensory modality) of the VA 606 (e.g., visible wavelengths perception, infrared wavelengths perception, olfactory perception, auditory perception, etc.). One of ordinary skill in the art will appreciate that the gestural input with the left hand 151 of the user 150 is merely an example user input and that the electronic device 120 may detect various other input modalities such as voice commands, hand tracking inputs, and/or the like.

As shown in FIG. 6E, during the instance 650 (e.g., associated with time $T_5$) of the recording scenario, the electronic device 120 presents the XR environment 128 including a menu 652 associated with toggling various layers. As one example, the electronic device 120 presents the menu 652 within the XR environment 128 in response to detecting a speech input from the user 150 associated with toggling layers. In FIG. 6E, the menu 652 includes a plurality of selectable options associated with layers that may be toggled on or off such as mesh/point cloud 654A, occlusion 654B, skeletal rig 654C, predicted trajectory 654D, predicted action 654E, markup 654F, application-specific information 654G, other 654H, and all 654I. For example, the plurality of selectable options within the menu 652 may be selected by various input modalities such as a tap/touch input on the display 122, a hand tracking input, a voice command, or the like. One of ordinary skill in the art will appreciate that the selectable options in the menu 652 are examples that may be modified in various other implementations.

As shown in FIG. 6E, during the instance 650 (e.g., associated with time $T_5$) of the recording scenario, the electronic device 120 detects a speech input 656 (e.g., "Select all.") associated with selecting the option 654I within the menu 652. In response to detecting the speech input 656, the electronic device 120 toggles on (or enables) all the layers while recording the current POV of the VA 606.

In some implementations, the XR environment 128 may include a plurality of UI elements, which, when selected, cause an operation or action within the XR environment 128 to be performed such as removing the XR content, manipulating the XR content, modifying the XR content, displaying a set of options, displaying a menu of other XR content that may be instantiated into the XR environment 128, and/or the like. For example, the operations or actions associated with the plurality of UI elements may include one of: translating the XR content within the XR environment 128, rotating the XR content within the XR environment 128, modifying the configuration or components of the XR content, modifying a shape or size of the XR content, modifying an appearance of the XR content (e.g., a texture, color, brightness, contrast, shadows, etc.), modifying lighting associated with the XR environment 128, modifying environmental conditions associated with the XR environment 128, and/or the like.

Figure 6F:
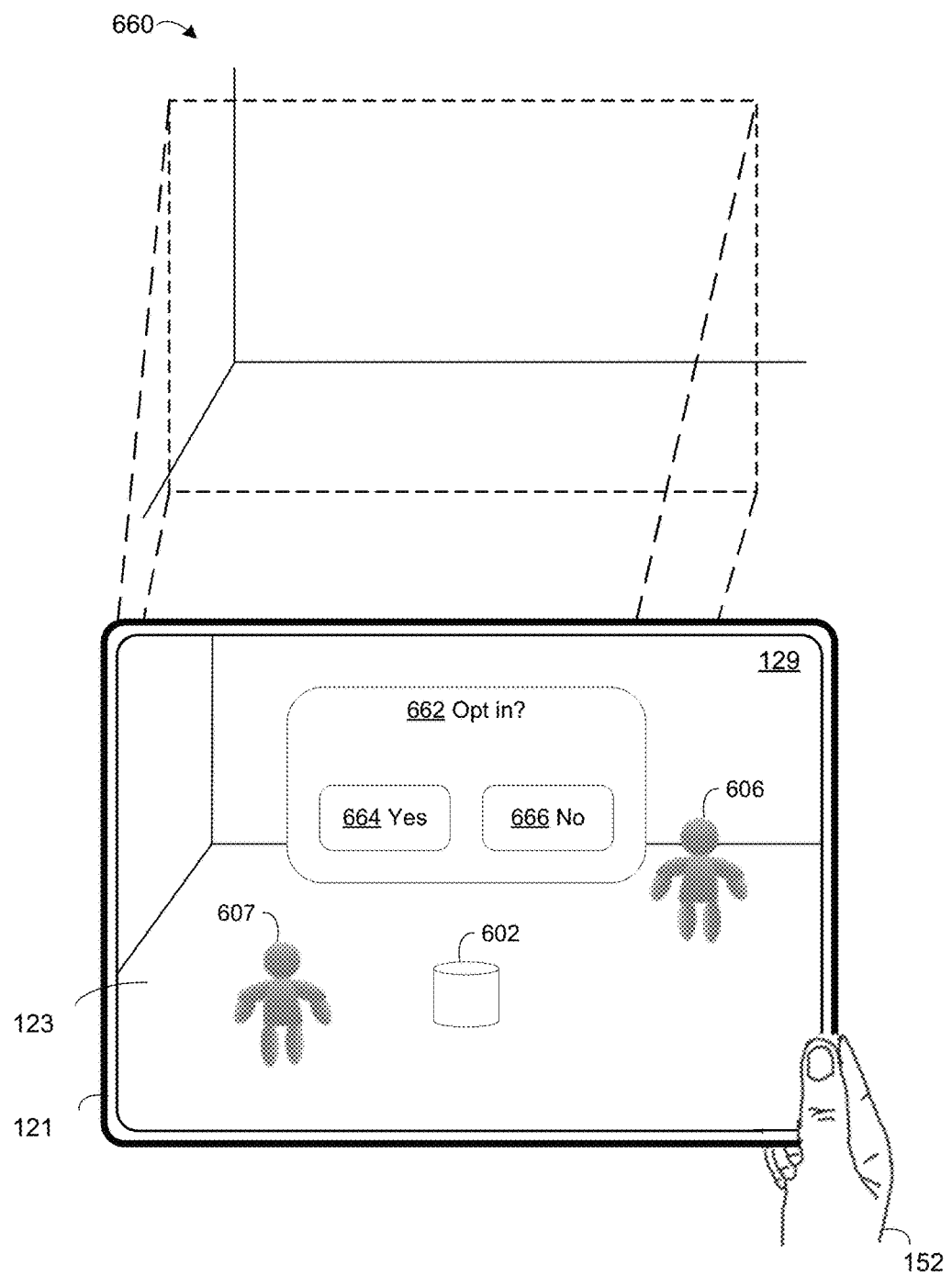

As shown in FIG. 6F, during the instance 660 (e.g., associated with time $T_3$) of the recording scenario, an electronic device 121, associated with a second user 152 that is also participating in the XR experience with the user 150, displays an XR environment 129 on a display 123 that includes the XR content 602 and virtual agents 606 and 607. For example, the virtual agent 607 corresponds to the user 150, the virtual agent 606 corresponds to a non-user character, and the virtual agent 604 corresponds to the second user 152. As shown in FIG. 6F, the XR environment 129 includes a notification 662 associated with opting into the recording initiated by the user 150 in FIG. 6C. As shown in FIG. 6F, the notification 662 includes a "Yes" affordance 664, which, when selected (e.g., with a touch input, a hand/extremity tracking input, a voice input, or the like), allows the virtual agent (e.g., the virtual agent 604 in FIGS. 6A-6E) of the second user 152 to be recorded by the user 150 and a "No" affordance 666, which, when selected, does not allow the virtual agent (e.g., the virtual agent 604 in FIGS. 6A-6E) of the second user 152 to be recorded by the user 150. One of ordinary skill in the art will appreciate that the notification 662 is merely an example notification and that the electronic device 120 may present various other notification visualizations or notification modalities such as haptic feedback, audible notifications, and/or the like.

As described above, including with respect to FIGS. 6A-6E, the present technology records information from XR sessions for purposes such as debugging computer programming instructions that are executed to provide the XR sessions. It is contemplated that the gathered information may include information regarding user movements and interactions with XR environments. Entities that are responsible for recording, collecting, storing, transmitting, and/or processing recorded XR information should comply with well-established privacy policies and/or privacy practices. These policies and/or practices should at least comport with or exceed industry or governmental requirements.

The present disclosure also contemplates that certain features, such as privacy architecture 408 (discussed above with reference to FIG. 4) and the recording indicator 635 (shown in FIGS. 6C-6E), can promote user awareness of recordings, whether those recordings are used for debugging or other permissible purposes. Further, as demonstrated in the exemplary illustrations of FIGS. 6A-6E, initiating XR recording involves explicit instructions provided by a user (e.g., user 150). In other words, a user has to opt-in to initiate recording. Also, as demonstrated in the example of FIG. 6F, other users (if any) who are being recorded are provided with notification, such that they can opt out. Implementers of the present technology are minded to consider these aspects, and any others, to best promote user privacy.

Figure 7A:
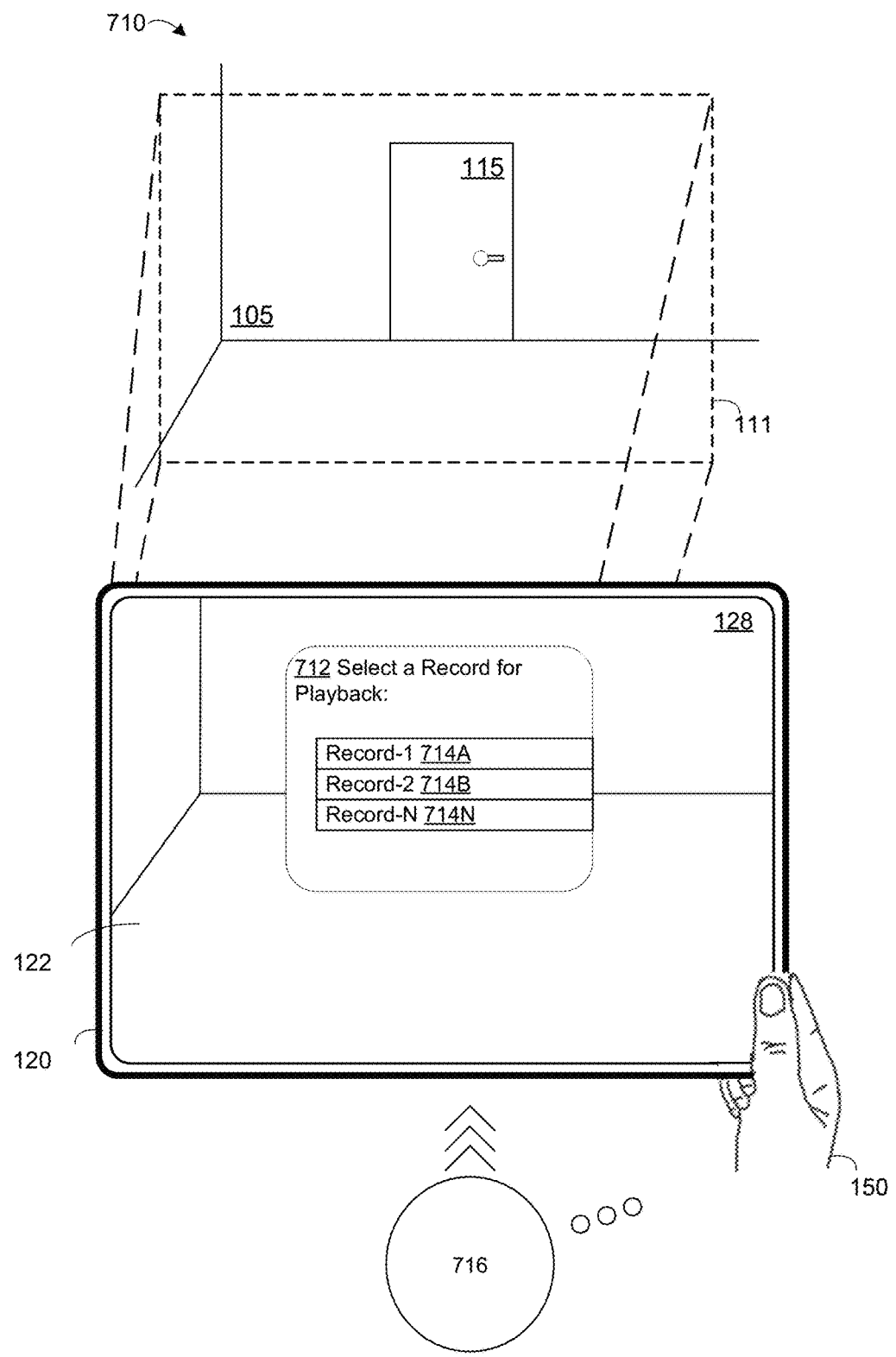
FIGS. 7A-7S illustrate a sequence of instances for a record playback scenario in accordance with some implementations.
Figure 7B:
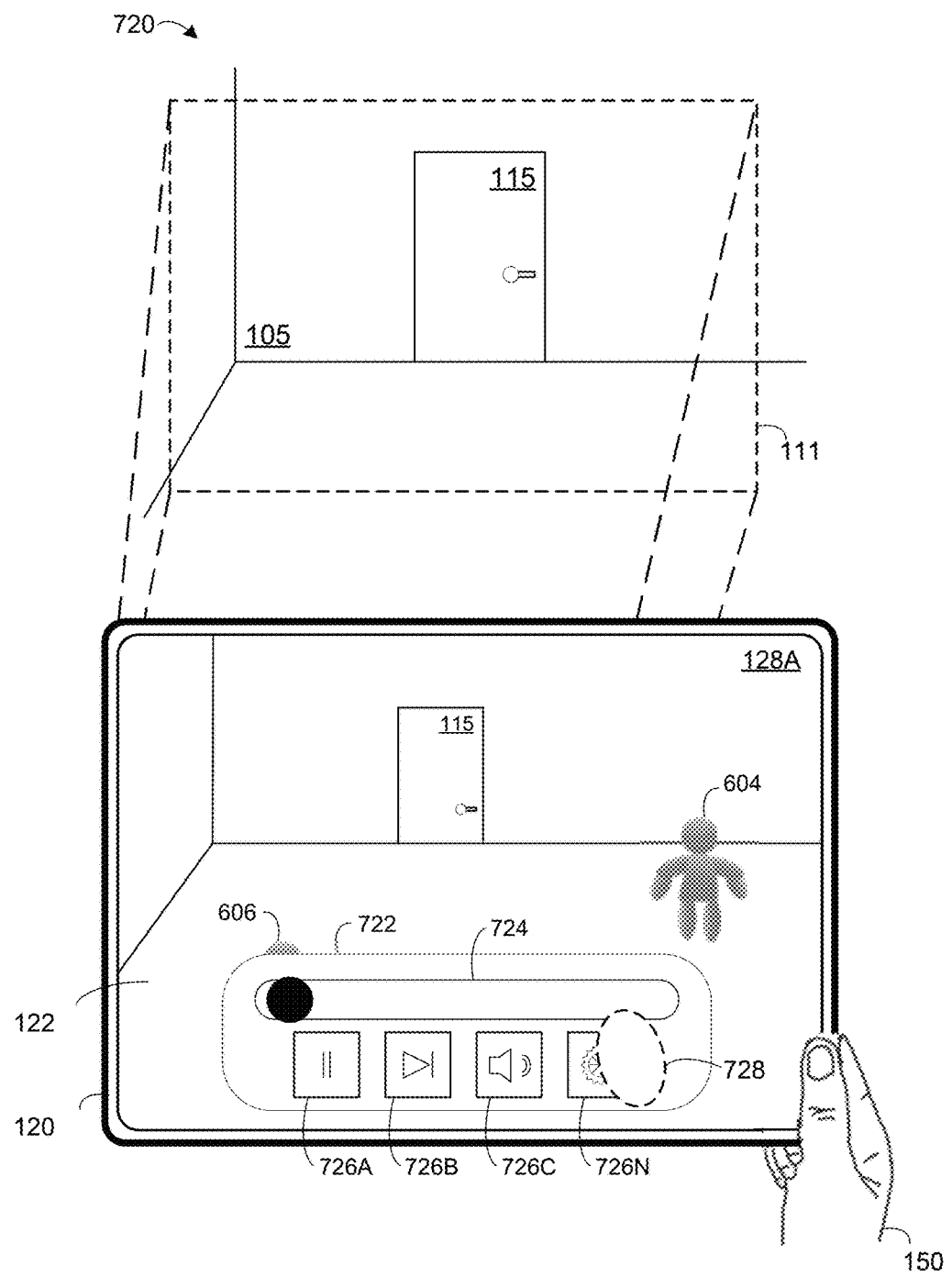
Figure 7C:
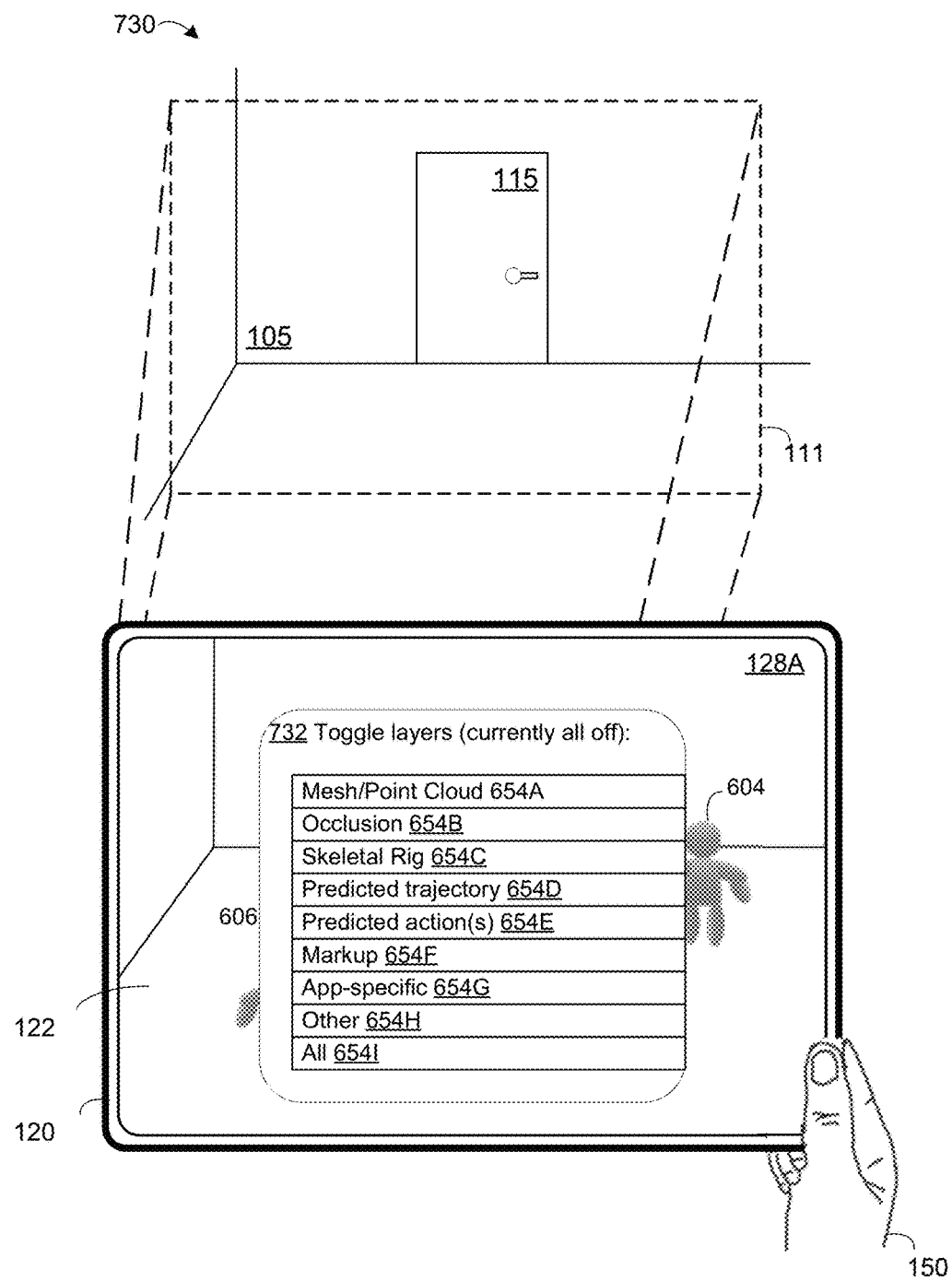
Figure 7D:
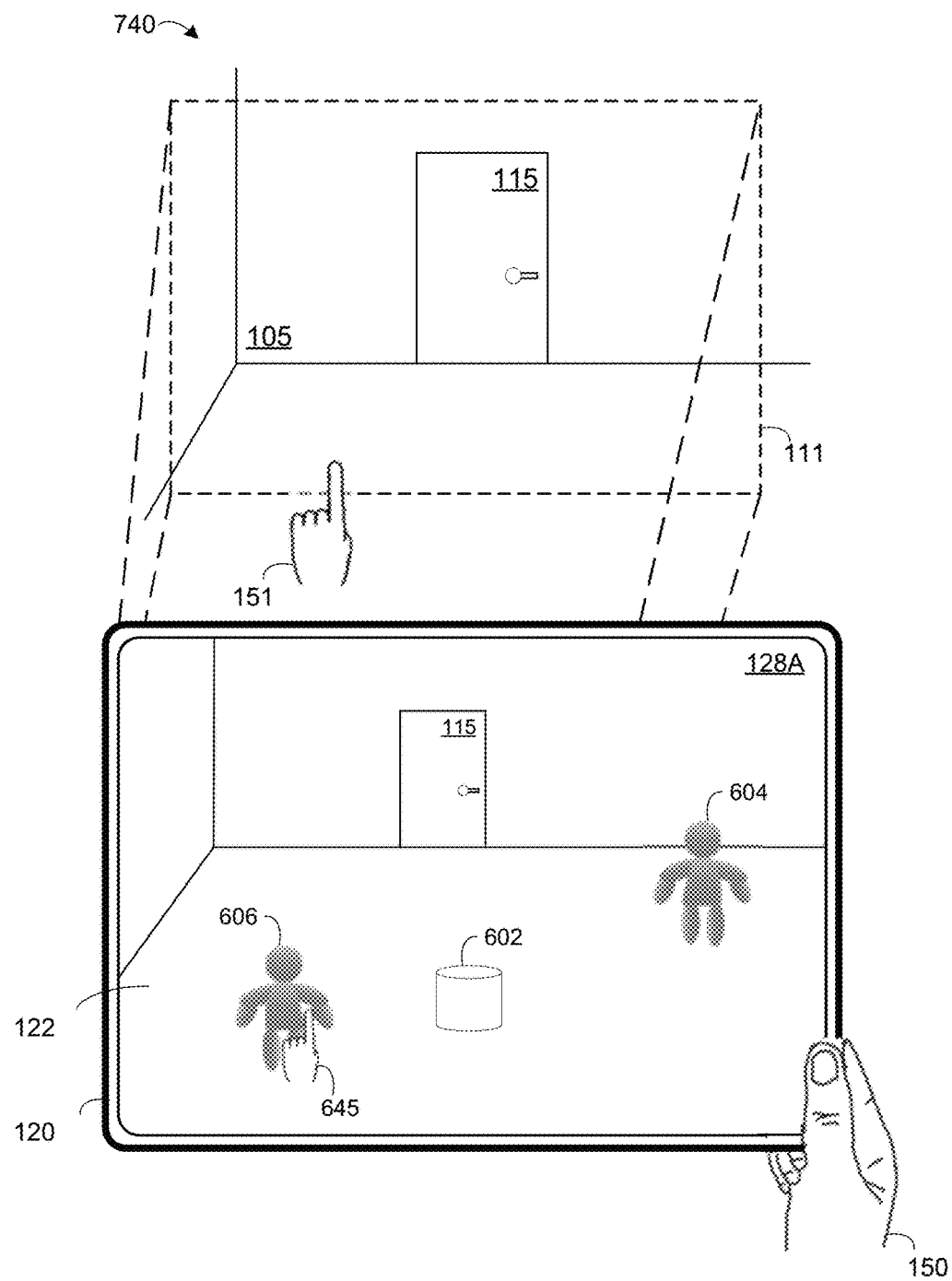
Figure 7E:
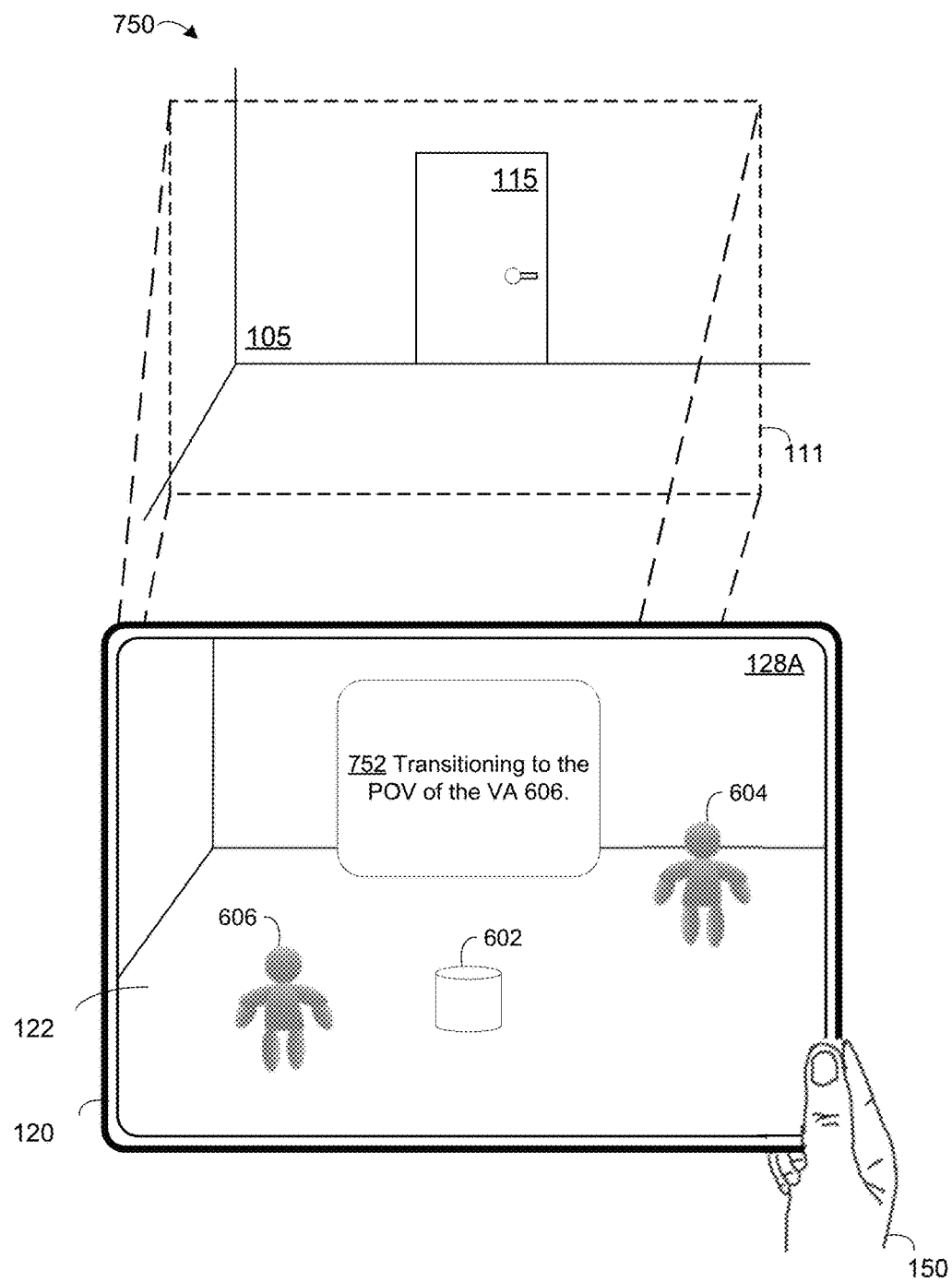
Figure 7F:
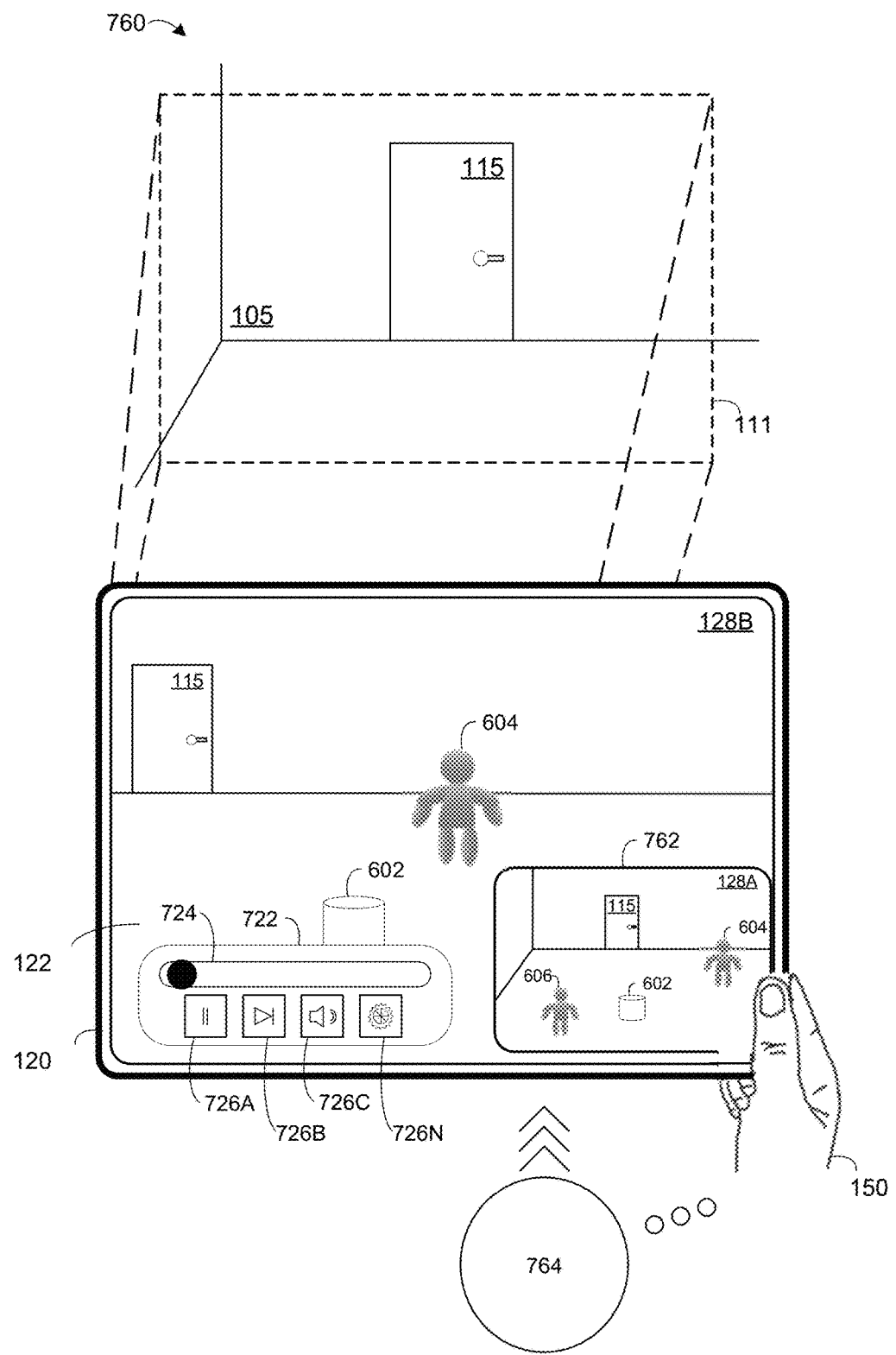
Figure 7G:
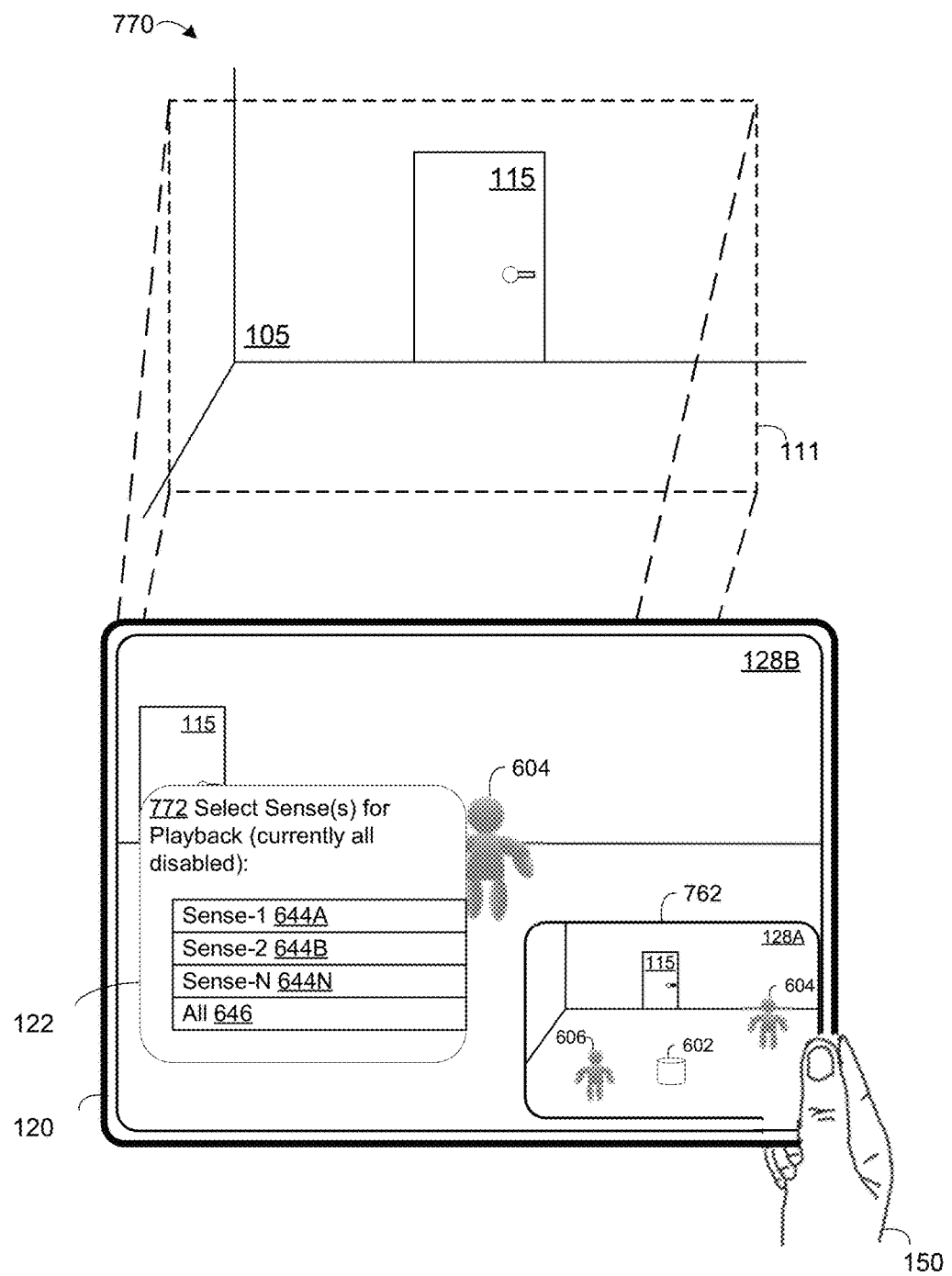
Figure 7H:
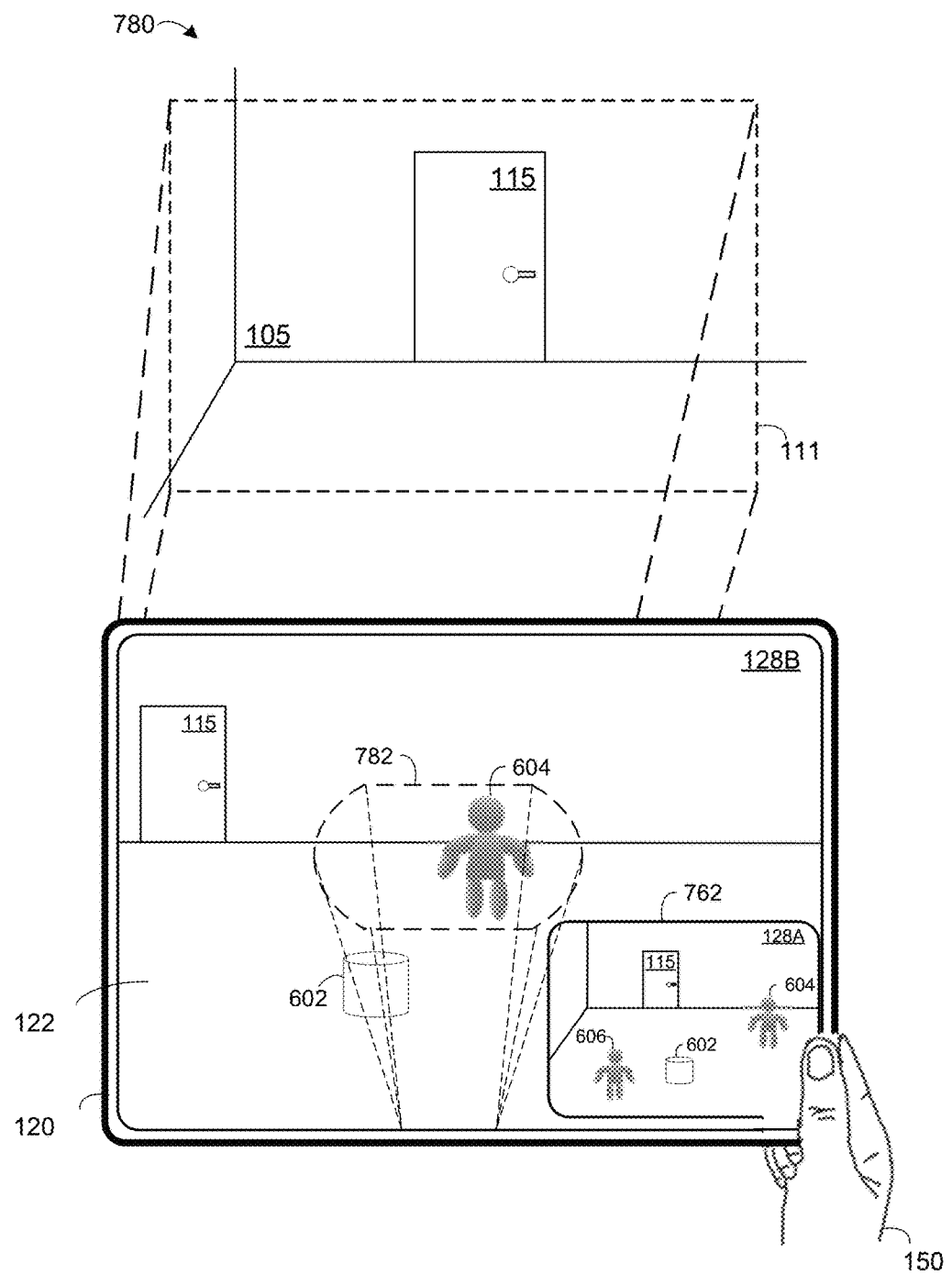
Figure 7I:
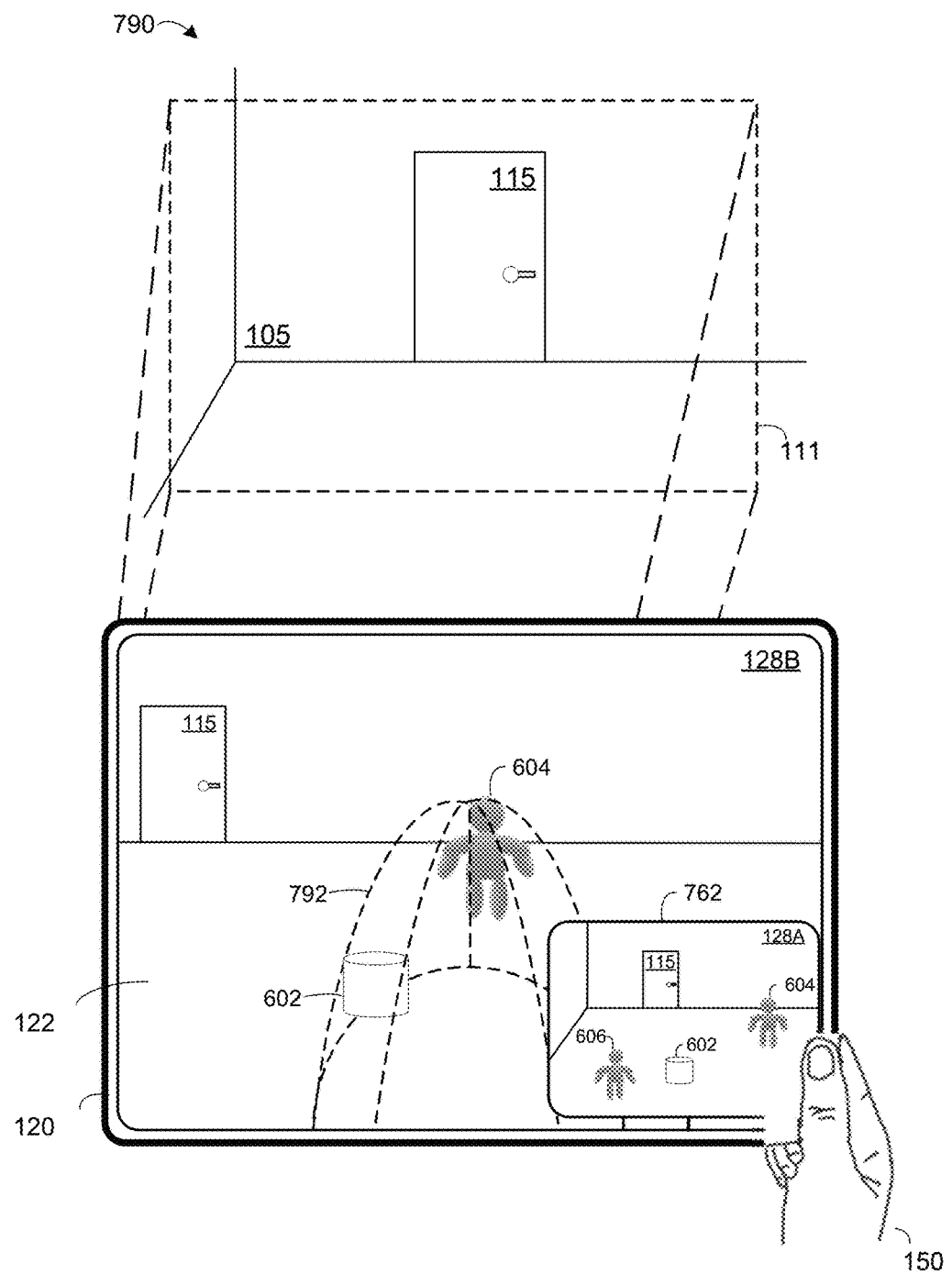
Figure 7J:
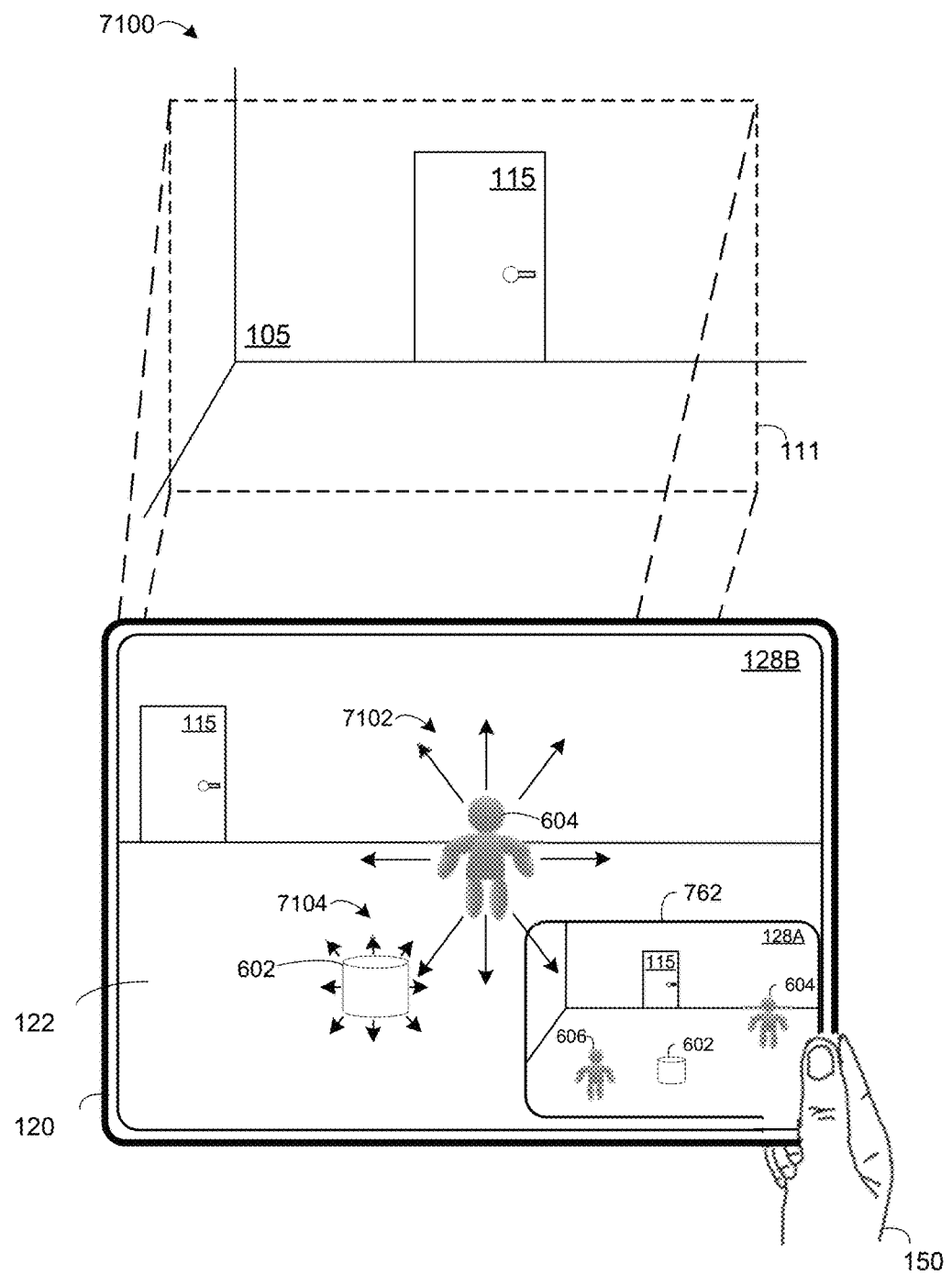
Figure 7K:
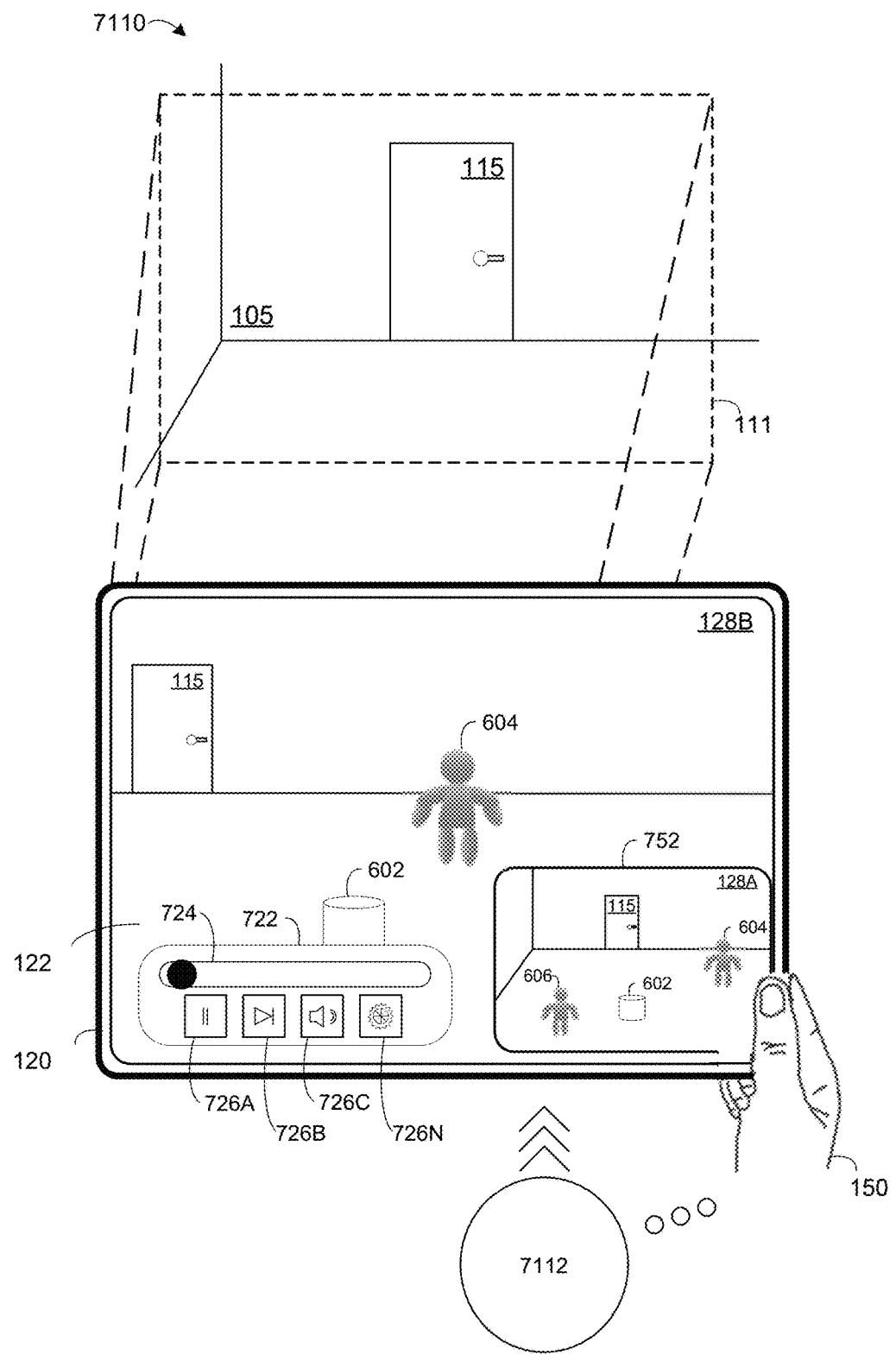
Figure 7L:
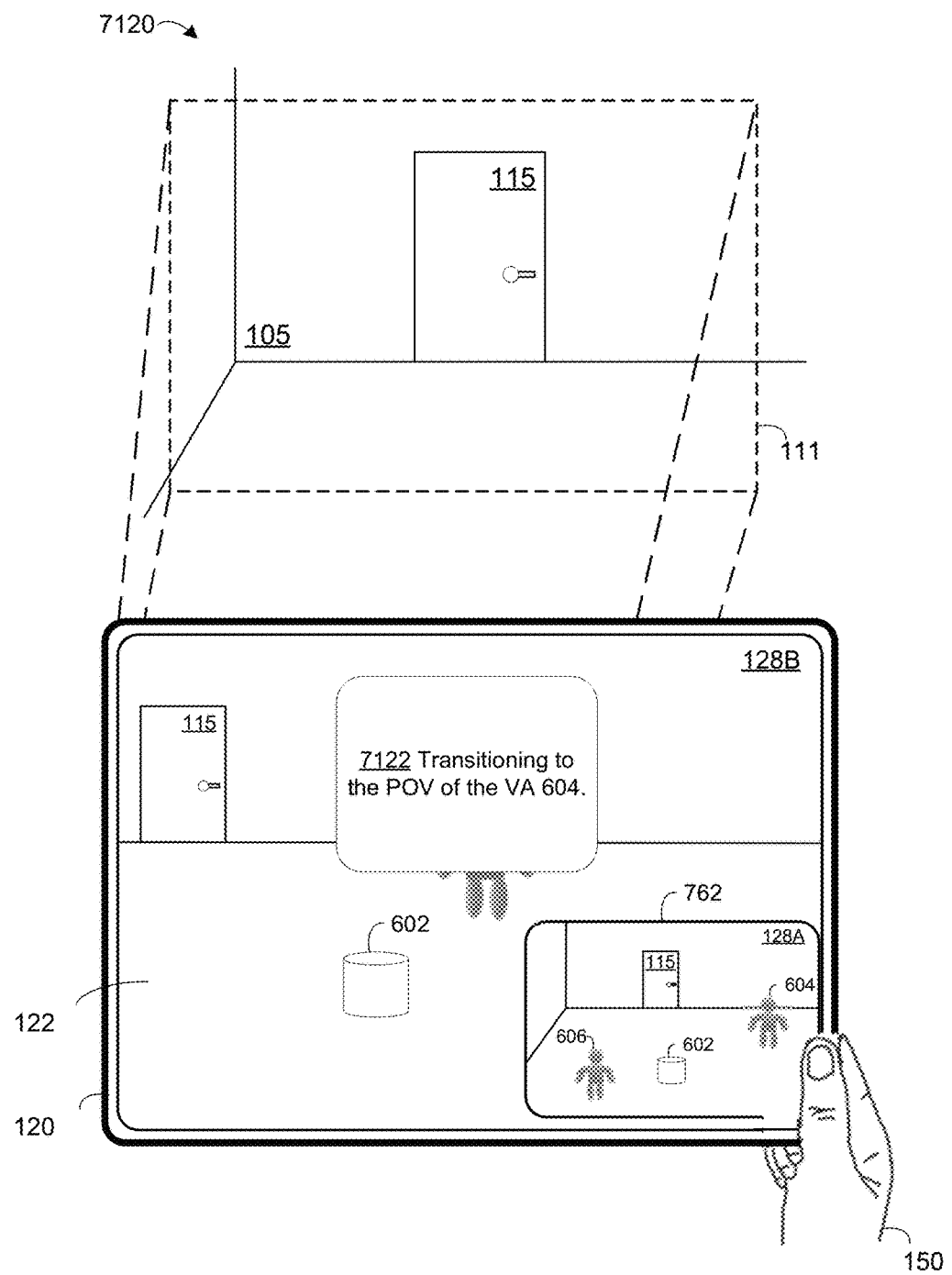
Figure 7M:
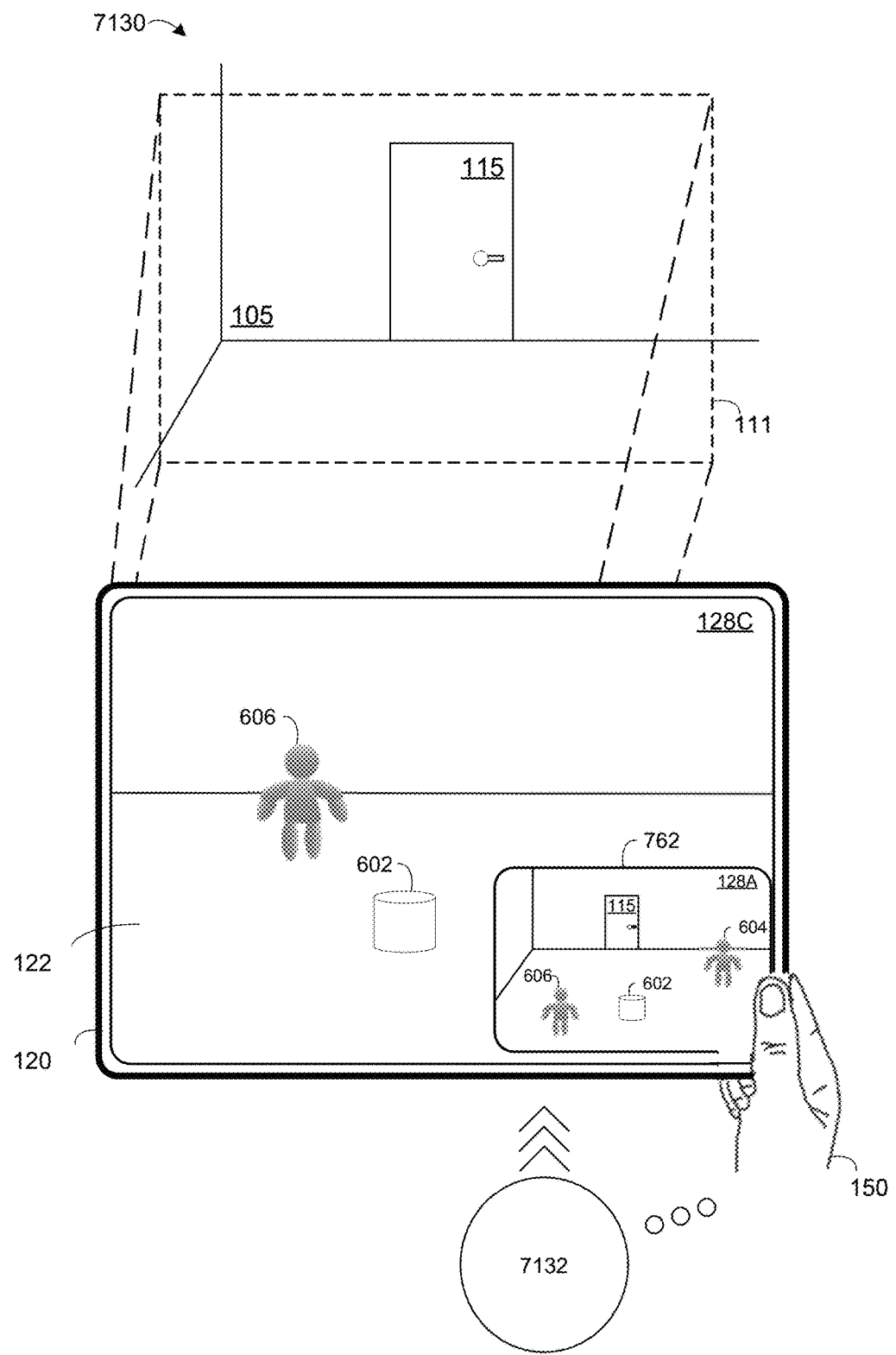
Figure 7N:
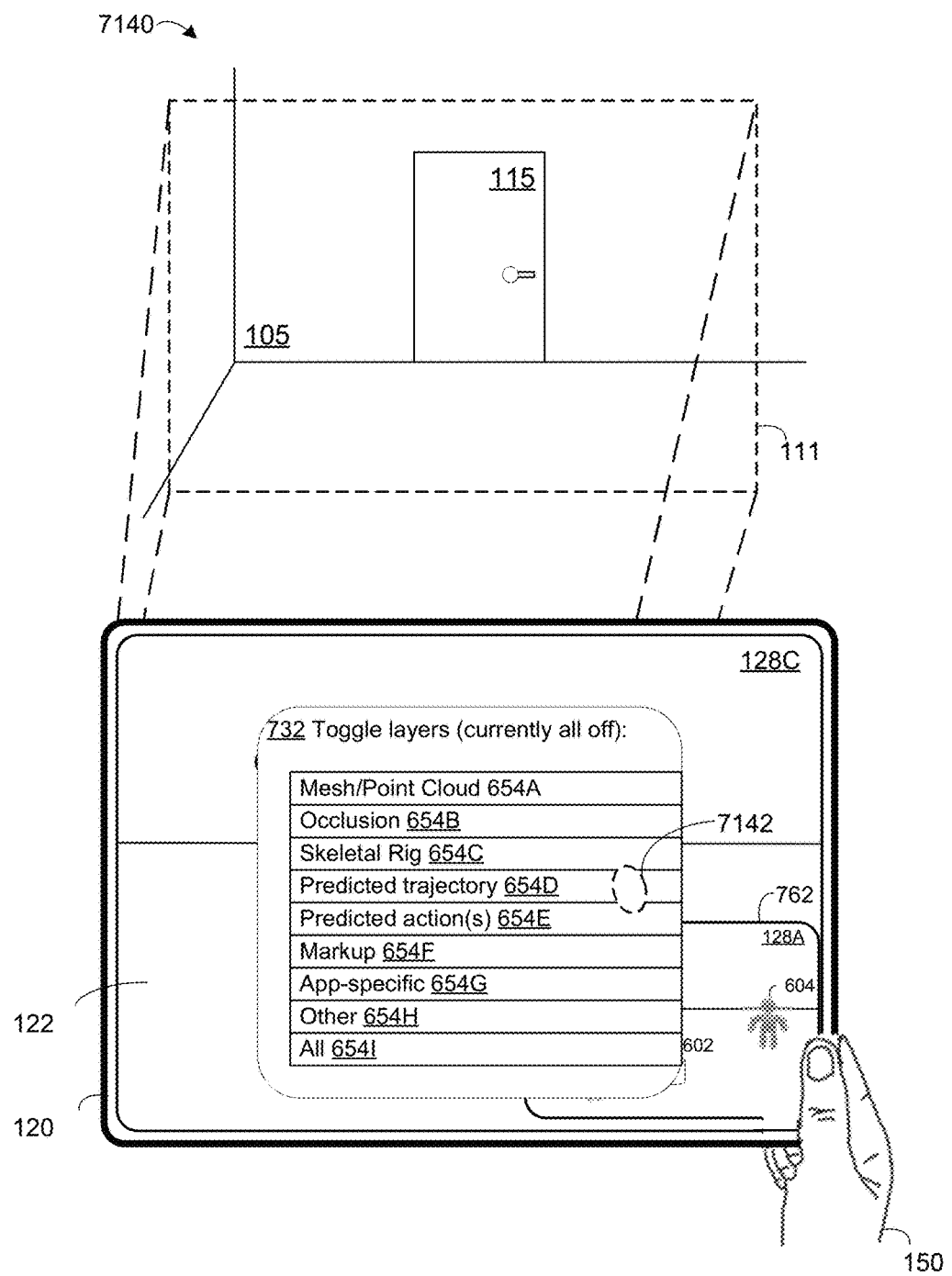
Figure 7O:
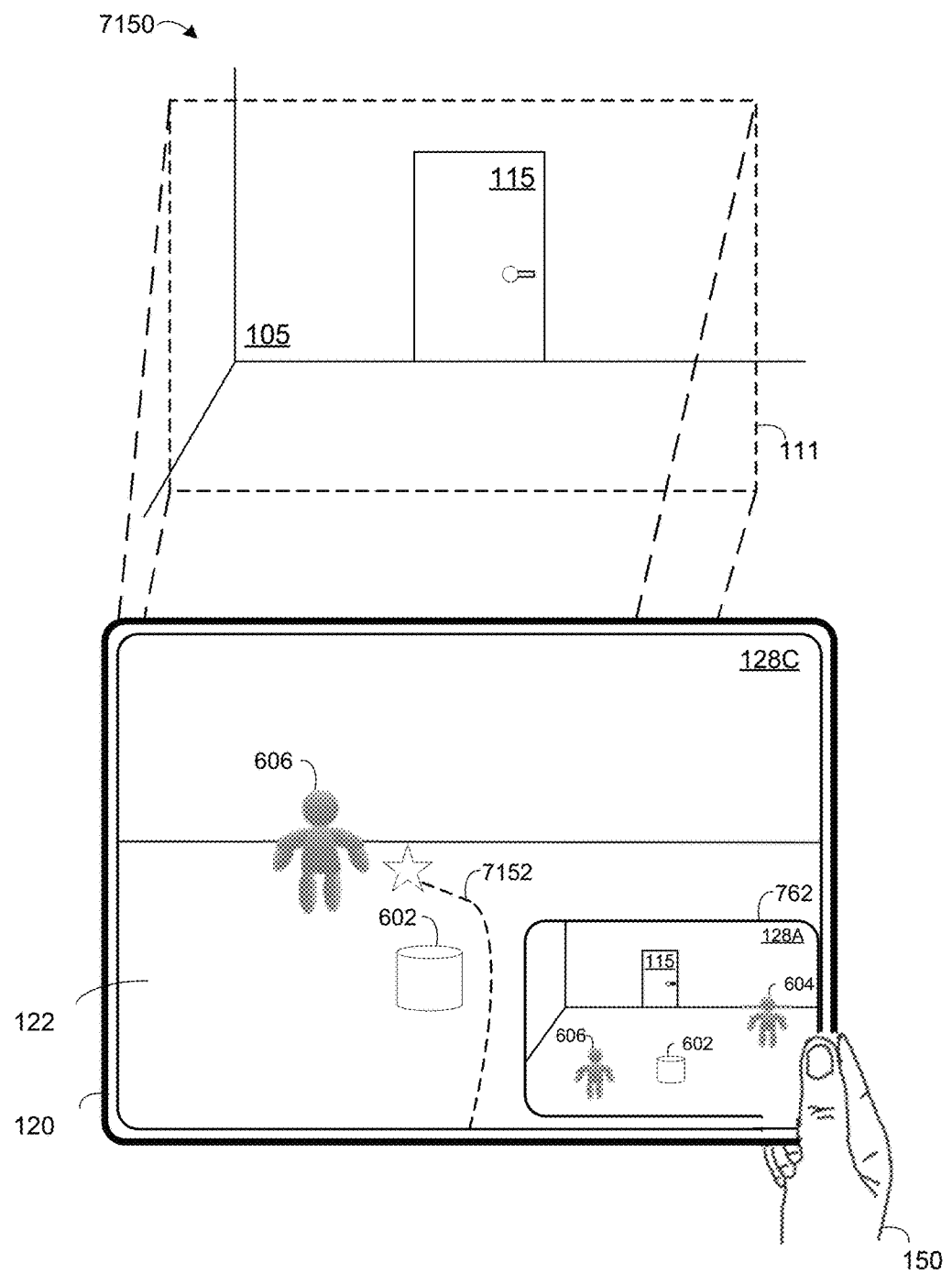
Figure 7P:
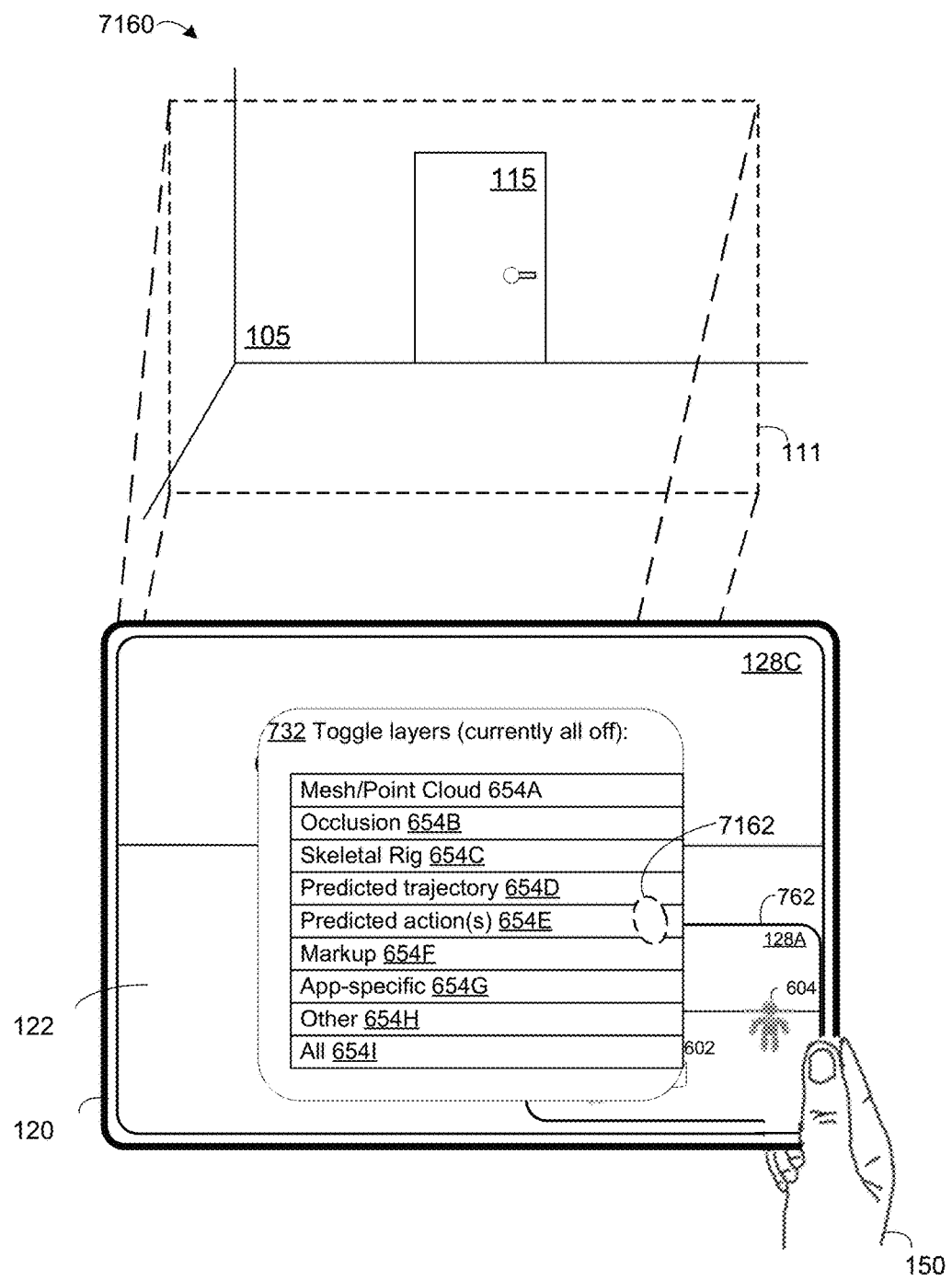
Figure 7Q:
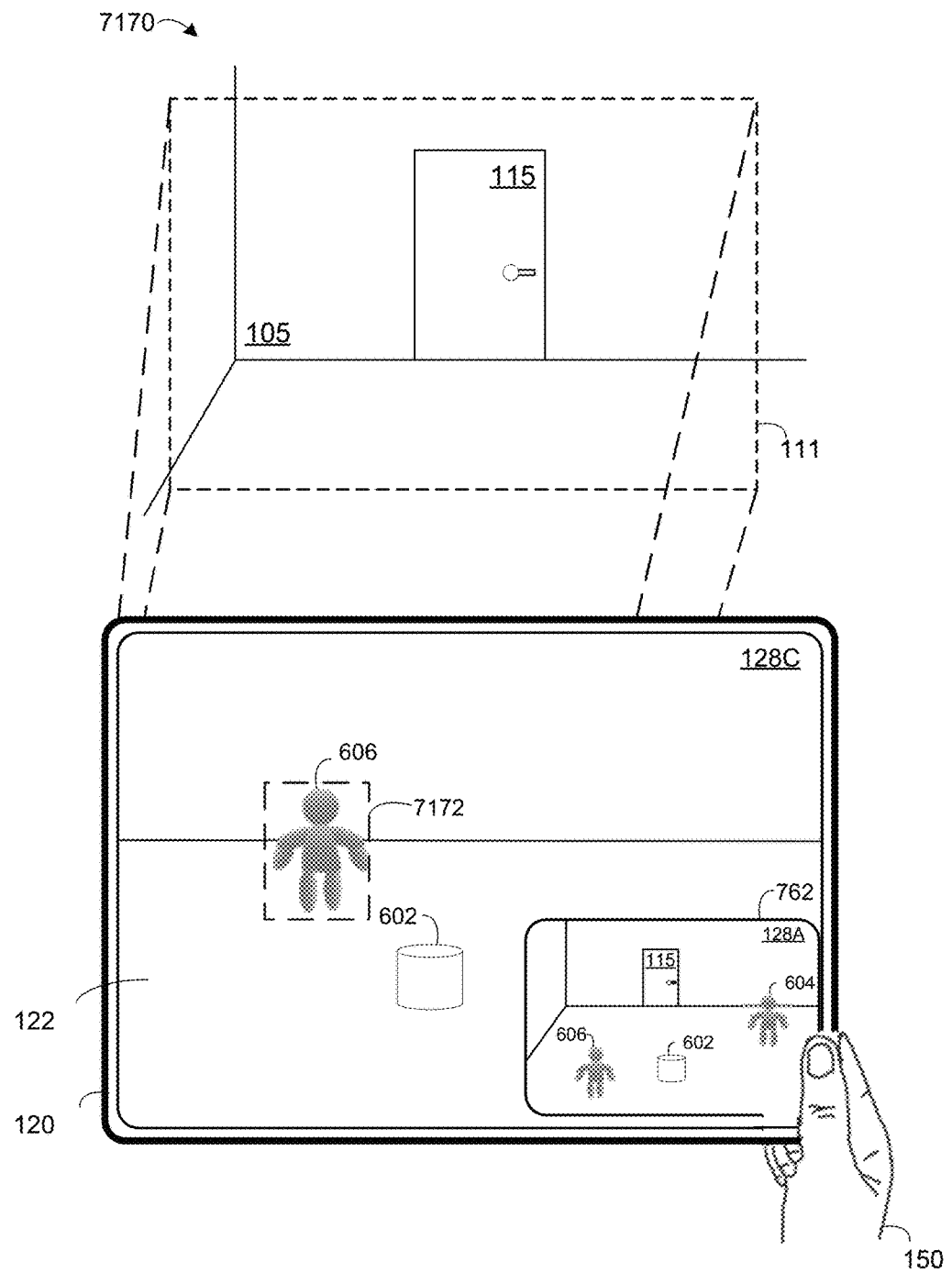
Figure 7R:
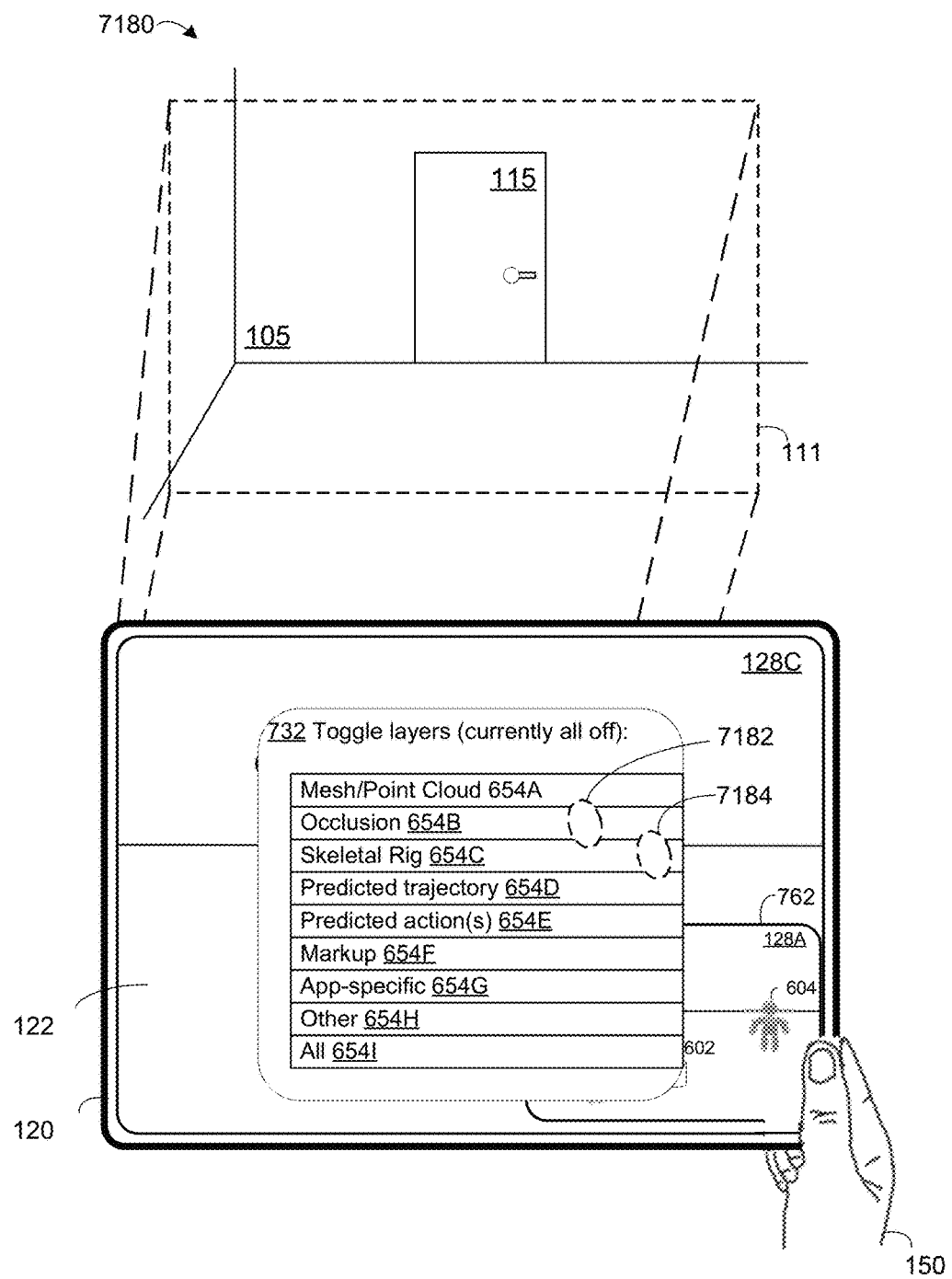
Figure 7S:
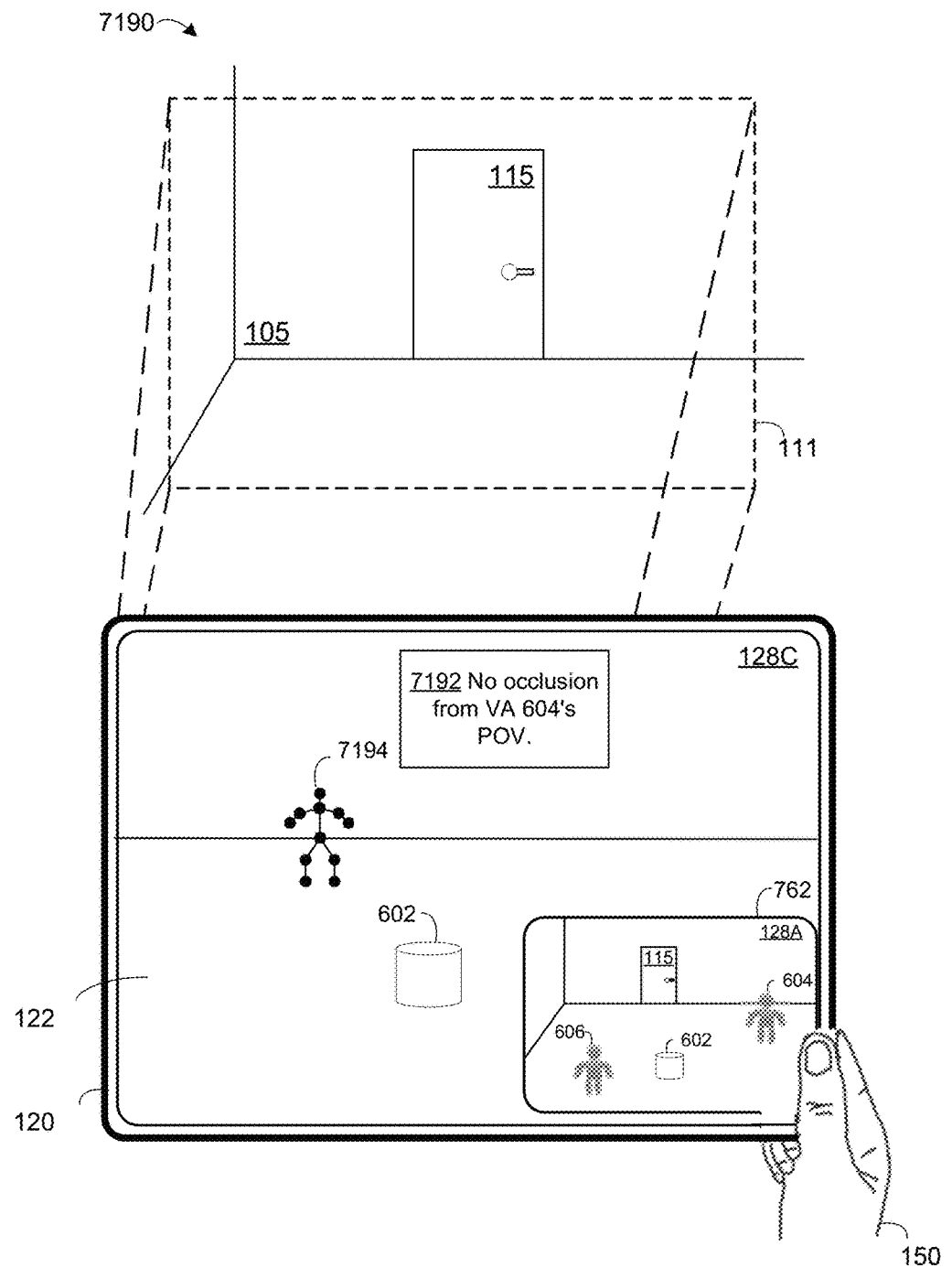

FIGS. 7A-7S illustrate a sequence of instances 710-7190 for a playback scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 710-7130 are rendered and presented by a computing system such as the controller 110 shown in FIGS. 1 and 2; the electronic device 120 shown in FIGS. 1 and 3; and/or a suitable combination thereof.

The sequence of instances 710-7190 in FIGS. 7A-7S are similar to and adapted from the sequence of instances 610-650 in FIGS. 6A-6E. As such, similar references numbers are used in FIGS. 6A-6E and FIGS. 7A-7S. Furthermore, only the differences between FIGS. 6A-6E and FIGS. 7A-7S are described below for the sake of brevity.

As shown in FIG. 7A, during the instance 710 (e.g., associated with time $T_1$) of the playback scenario, the electronic device 120 presents an XR environment 128 including: a menu 712 associated with a plurality of pre-existing records for playback. In FIG. 7A, the menu 712 includes a plurality of selectable options associated with pre-existing records such as record-1 714A, record-2 714B, and record-N 714N. For example, the plurality of selectable options within the menu 712 may be selected by various input modalities such as a tap/touch input on the display 122, a hand tracking input, a voice command, or the like. As shown in FIG. 7A, during the instance 710 (e.g., associated with time $T_1$) of the playback scenario, the electronic device 120 detects a speech input 716 (e.g., "Please playback record-1.") associated with selecting the option 714A within the menu 712.

As shown in FIG. 7B, during the instance 720 (e.g., associated with time $T_2$) of the playback scenario, the electronic device 120 presents an XR environment 128A associated with a first POV of the record-1 714A (e.g., a neutral POV or a POV associated with the user 150), including the XR content 602 (e.g., the 3D cylinder) and virtual agents 604 and 606 (e.g., as described in FIGS. 6A-6E), in response to detecting the speech input 716 in FIG. 7A. In FIG. 7B, the XR environment 128A includes a control menu 722 with a plurality of UI elements for controlling playback such as a temporal scrubber 724, a pause affordance 726A, a play affordance 726B, a volume adjustment affordance 726C, and an options affordance 726N. For example, the plurality of UI elements for controlling playback within the control menu 722 may be controlled by various input modalities such as a tap/touch input on the display 122, a hand tracking input, a voice command, or the like. One of ordinary skill in the art will appreciate that the affordances and layout of the control menu 722 is an example that may be modified in myriad ways in various other implementations.

As shown in FIG. 7B, during the instance 720 (e.g., associated with time $T_2$) of the playback scenario, the electronic device 120 detects a user input 728 (e.g., a single or double-tap gesture on the display 122) at a location that corresponds to the options affordance 726N within the control menu 722. One of ordinary skill in the art will appreciate that user input 728 is merely an example user input and that the electronic device 120 may detect various other input modalities such as voice commands, hand tracking inputs, and/or the like.

As shown in FIG. 7C, during the instance 730 (e.g., associated with time $T_3$) of the playback scenario, the electronic device 120 presents a menu 732 associated with toggling various layers in response to detecting the user input 728 in FIG. 7B. In FIG. 7C, the menu 732 includes a plurality of selectable options associated with layers that may be toggled on or off such as mesh/point cloud 654A, occlusion 654B, skeletal rig 654C, predicted trajectory 654D, predicted action 654E, markup 654F, application-specific information 654G, other 654H, and all 654I. For example, the plurality of selectable options within the menu 732 may be selected by various input modalities such as a tap/touch input on the display 122, a hand tracking input, a voice command, or the like.

As shown in FIG. 7D, during the instance 740 (e.g., associated with time $T_4$) of the playback scenario, the electronic device 120 continues to present the record-1 714A, including the XR content 602 (e.g., the 3D cylinder) and virtual agents 604 and 606, from the first POV. As shown in FIG. 7D, during the instance 740 (e.g., associated with time $T_4$) of the playback scenario, the electronic device 120 detects, via the body/head pose tracking engine 412, a gestural input with the left hand 151 of the user 150 associated with selecting the VA 606 within the XR environment 128A. In FIG. 7D, the electronic device 120 presents the representation 645 of the left hand 151 of the user 150 within the XR environment 128A. One of ordinary skill in the art will appreciate that the gestural input with the left hand 151 of the user 150 is merely an example user input and that the electronic device 120 may detect various other input modalities such as voice commands, hand tracking inputs, and/or the like.

As shown in FIG. 7E, during the instance 750 (e.g., associated with time $T_5$) of the playback scenario, the electronic device 120 presents the XR environment 128A including a text box 752 (e.g., "Transitioning to the POV of the VA 606.") associated with confirming a POV transition in response to detecting the gestural input with the left hand 151 in FIG. 7D. One of ordinary skill in the art will appreciate that the text box 752 is merely an example notification and that the electronic device 120 may present various other notification visualizations or notification modalities such as haptic feedback, audible notifications, and/or the like.

As shown in FIG. 7F, during the instance 760 (e.g., associated with time $T_6$) of the playback scenario, the electronic device 120 presents an XR environment 128B associated with a second POV of the record-1 714A (e.g., the POV of the VA 606), including the XR content 602 (e.g., the 3D cylinder) and the virtual agent 604. In FIG. 7F, the XR environment 128B includes the control menu 722 and a view 762 of the XR environment 128A. One of ordinary skill in the art will appreciate that the picture-in-picture (PIP) nature of the view 762 of the XR environment 128A may be modified or otherwise changed in various other implementations. As shown in FIG. 7F, during the instance 760 (e.g., associated with time $T_6$) of the playback scenario, the electronic device 120 detects a speech input 764 (e.g., "Show sensory perception options.") associated with showing visualizations of various sensory modalities.

As shown in FIG. 7G, during the instance 770 (e.g., associated with time $T_7$) of the playback scenario, the electronic device 120 continues to present the XR environment 128B associated with the second POV of the record-1 714A (e.g., the POV of the VA 606) and also presents a menu 772 in response to detecting the speech input 764 in FIG. 7F. In FIG. 7G, the menu 772 includes a plurality of selectable options associated with toggling on or off various sensory modalities of the VA 606 such as sense-1 644A, sense-2 644B, sense-N 644N, and all senses 646. For example, the plurality of selectable options within the menu 772 may be selected by various input modalities such as a tap/touch input on the display 122, a hand tracking input, a voice command, or the like.

As shown in FIG. 7H, during the instance 780 (e.g., associated with time $T_8$) of the playback scenario, the electronic device 120 presents a visualization 782 of a visual sensory perception of the VA 606 based on a perception profile for the VA 606 in response to detecting selection of the sense-1 644A within the menu 772 in FIG. 7G. One of ordinary skill in the art will appreciate that the visual visualization 782 in FIG. 7H is an example that may be replaced or otherwise modified in various other implementations. For example, the perception profile for the VA 606 includes parameters and acuity values for the various sensory perceptions of the VA 606. Continuing with this example, the perception profile for the VA 606 may include a visual acuity value (e.g., 20/20 vision) associated with the visual sensory perception of the VA 606, a focal length value associated with the visual sensory perception of the VA 606, a 3D shape for a viewing frustum (e.g., a cone or the like) visual associated with the visual sensory perception of the VA 606, and/or the like.

As shown in FIG. 7I, during the instance 790 (e.g., associated with time $T_9$) of the playback scenario, the electronic device 120 presents a visualization 792 of an auditory sensory perception of the VA 606 based on a perception profile for the VA 606 in response to detecting selection of the sense-2 644B within the menu 772 in FIG. 7G. One of ordinary skill in the art will appreciate that the auditory visualization 792 in FIG. 7I is an example that may be replaced or otherwise modified in various other implementations. For example, the perception profile for the VA 606 includes parameters and acuity values for the various sensory perceptions of the VA 606. Continuing with this example, the perception profile for the VA 606 may include one or more auditory acuity values (e.g., a frequency range, a sensitivity value, etc.) associated with the auditory sensory perception of the VA 606, a 3D shape for an auditory range (e.g., a sphere, a partial sphere, or the like) associated with the auditory sensory perception of the VA 606, and/or the like.

As shown in FIG. 7J, during the instance 7100 (e.g., associated with time $T_{10}$) of the playback scenario, the electronic device 120 presents a first visualization 7102 and a second visualization 7104 of an olfactory sensory perception of the VA 606 relative to the VA 604 and the XR content 602, respectively, based on a perception profile for the VA 606 in response to detecting selection of the sense-N 644N within the menu 772 in FIG. 7G. As one example, with respect to the first visualization 7102 and the second visualization 7104, stronger smells (as perceived by the VA 606) are associated with longer or thicker directional arrows. One of ordinary skill in the art will appreciate that the olfactory visualizations 7102 and 7104 in FIG. 7J is an example that may be replaced or otherwise modified in various other implementations with a heat map, a vector field, a particle flow, highlighting of objects that are smellable or emitting a smell, and/or the like.

For example, the perception profile for the VA 606 includes parameters and acuity values for the various sensory perceptions of the VA 606. Continuing with this example, the perception profile for the VA 606 may include one or more olfactory acuity values (e.g., a smell range, a sensitivity value, etc.) associated with the olfactory sensory perception of the VA 606, a 3D shape for an auditory range (e.g., a sphere, a partial sphere, or the like) associated with the olfactory sensory perception of the VA 606, and/or the like.

As shown in FIG. 7K, during the instance 7110 (e.g., associated with time $T_{11}$) of the playback scenario, the electronic device 120 continues to present the XR environment 128B associated with the second POV of the record-1 714A (e.g., the POV of the VA 606). Furthermore, in FIG. 7K, during the instance 7110 (e.g., associated with time $T_{11}$) of the playback scenario, the electronic device 120 detects a speech input 7112 (e.g., "Switch to the POV of the VA 604.") associated with another POV transition.

As shown in FIG. 7L, during the instance 7120 (e.g., associated with time $T_{12}$) of the playback scenario, the electronic device 120 continues to present the XR environment 128B associated with the second POV of the record-1 714A and also presents a text box 7122 (e.g., "Transitioning to the POV of the VA 604.") associated with confirming the POV transition in response to detecting the speech input 7112 FIG. 7K. One of ordinary skill in the art will appreciate that the text box 7122 is merely an example notification and that the electronic device 120 may present various other notification visualizations or notification modalities such as haptic feedback, audible notifications, and/or the like.

As shown in FIG. 7M, during the instance 7130 (e.g., associated with time Tia) of the playback scenario, the electronic device 120 presents an XR environment 128C associated with a third POV of the record-1 714A (e.g., the POV of the VA 604), including the XR content 602 (e.g., the 3D cylinder) and the virtual agent 606. In FIG. 7M, the XR environment 128C includes the view 762 of the XR environment 128A. One of ordinary skill in the art will appreciate that the PIP nature of the view 762 of the XR environment 128A may be modified or otherwise changed in various implementations. Furthermore, in FIG. 7M, during the instance 7130 (e.g., associated with time $T_{13}$) of the playback scenario, the electronic device 120 detects a speech input 7132 (e.g., "Display the layer toggling menu.") associated with displaying the menu 732 associated with toggling various layers.

As shown in FIG. 7N, during the instance 7140 (e.g., associated with time $T_{14}$) of the playback scenario, the electronic device 120 presents the menu 732 associated with toggling various layers in response to detecting the speech input 7132 in FIG. 7M. Furthermore, in FIG. 7N, during the instance 7140 (e.g., associated with time $T_{14}$) of the playback scenario, the electronic device 120 detects a user input 7142 (e.g., a single or double-tap gesture on the display 122) at a location that corresponds to the affordance 654D within the menu 732. One of ordinary skill in the art will appreciate that user input 7142 is merely an example user input and that the electronic device 120 may detect various other input modalities such as voice commands, hand tracking inputs, and/or the like.

As shown in FIG. 7O, during the instance 7150 (e.g., associated with time $T_{15}$) of the playback scenario, the electronic device 120 displays a predicted trajectory or path 7152 for the VA 604 in response to detecting selection of the affordance 654D in FIG. 7N.

As shown in FIG. 7P, during the instance 7160 (e.g., associated with time $T_{16}$) of the playback scenario, the electronic device 120 presents the menu 732 associated with toggling various layers in response to detecting the speech input 7132 in FIG. 7M. Furthermore, in FIG. 7P, during the instance 7160 (e.g., associated with time $T_{16}$) of the playback scenario, the electronic device 120 detects a user input 7162 (e.g., a single or double-tap gesture on the display 122) at a location that corresponds to the affordance 654E within the menu 732. One of ordinary skill in the art will appreciate that user input 7162 is merely an example user input and that the electronic device 120 may detect various other input modalities such as voice commands, hand tracking inputs, and/or the like.

As shown in FIG. 7Q, during the instance 7170 (e.g., associated with time $T_{17}$) of the playback scenario, the electronic device 120 displays an indication of a predicted action 7172 for the VA 604 in response to detecting selection of the affordance 654E in FIG. 7P. For example, the predicted action 7172 (e.g., interacting with VA 606) corresponds to a current goal of the VA 604 such as engaging in dialogue with other VAs, acting out a short skit with the VA 606, or the like.

As shown in FIG. 7R, during the instance 7180 (e.g., associated with time $T_{18}$) of the playback scenario, the electronic device 120 presents the menu 732 associated with toggling various layers in response to detecting the speech input 7132 in FIG. 7M. Furthermore, in FIG. 7R, during the instance 7180 (e.g., associated with time $T_{18}$) of the playback scenario, the electronic device 120 detects a first user input 7182 (e.g., a single or double-tap gesture on the display 122) at a location that corresponds to the affordance 654B within the menu 732 and also detects a second user input 7184 (e.g., a single or double-tap gesture on the display 122) at a location that corresponds to the affordance 654C within the menu 732. One of ordinary skill in the art will appreciate that the user input 7182 and 7184 is merely an example user input and that the electronic device 120 may detect various other input modalities such as voice commands, hand tracking inputs, and/or the like.

As shown in FIG. 7S, during the instance 7190 (e.g., associated with time $T_{19}$) of the playback scenario, the electronic device 120 displays a notification 7192 (e.g., "No occlusion from VA 604's POV.") in response to detecting selection of the affordance 654B in FIG. 7R. Furthermore, in FIG. 7S, during the instance 7190 (e.g., associated with time $T_{19}$) of the playback scenario, the electronic device 120 displays a skeletal representation 7194 of the VA 606 in response to detecting selection of the affordance 654C in FIG. 7R.

Figure 8:
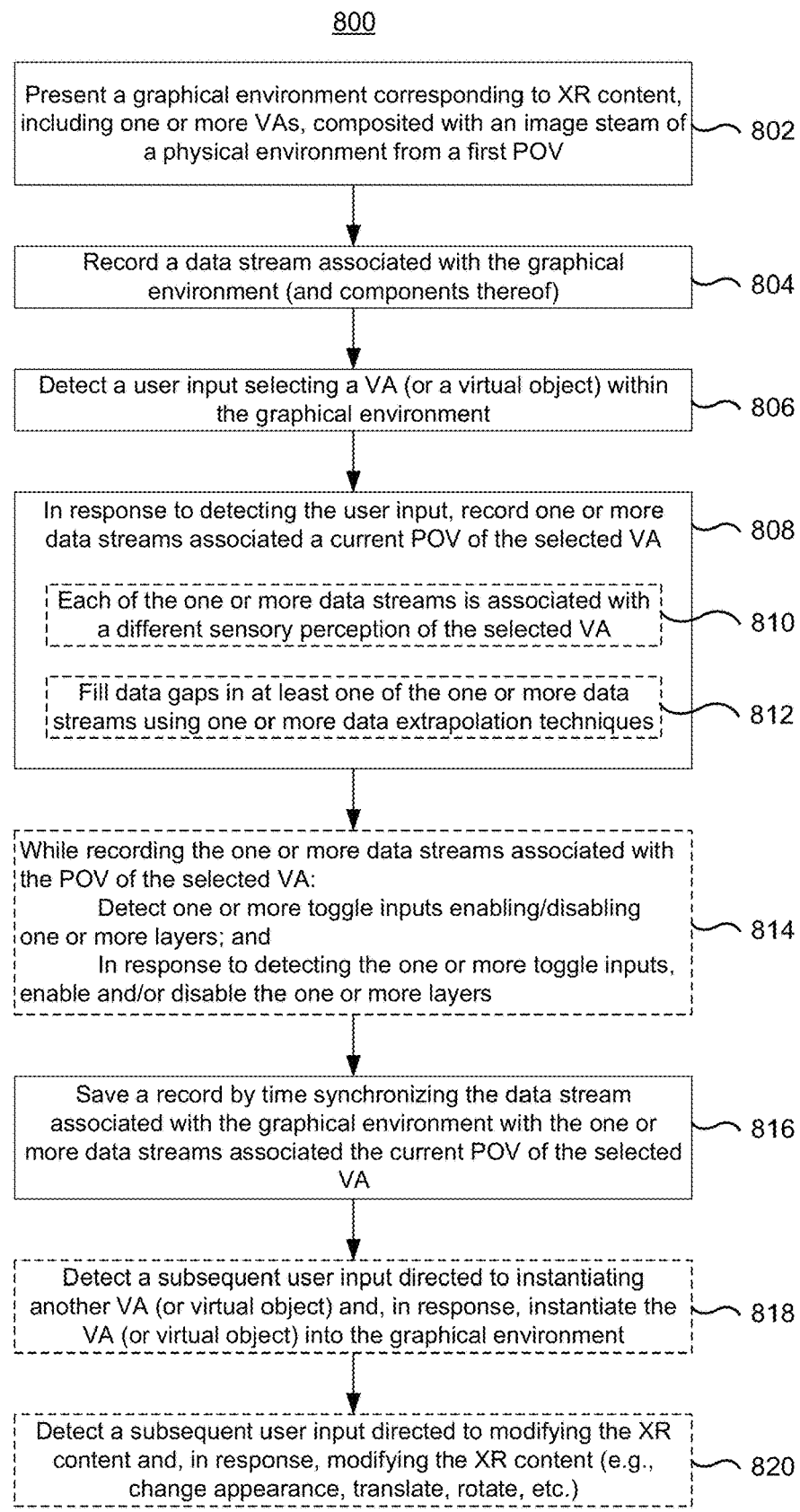
FIG. 8 is a flowchart representation of a method of recording an XR environment in accordance with some implementations.

FIG. 8 is a flowchart representation of a method 800 of recording an XR environment in accordance with some implementations. In various implementations, the method 800 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, an XR experience may be recorded whereby the recorded video data includes a composition of both video pass-through data associated with a scene and XR data. This recorded video data may be insufficient when a developer intends to debug program execution and graphical content playback such as virtual agents (VAs) and/or the XR content. As such, the innovation described herein, enables an XR experience to be recorded from the perspective of the user and also from the perspective of various senses of selected VAs. As such, during playback, the user may see through the eyes of a virtual agent or hear what the VA hears or visualize what the VA can smell. Furthermore, various layers may be toggled on/off during playback such as MR content, video pass-through, occlusion, markup, meshes, point clouds, skeletal rigs, application-specific data or the like. In other words, the methods described herein enable improved debugging, development, and general recording for sharing or keepsake purposes by allowing a user to select individual entities within a graphical environment for recordation and playback.

As represented by block 802, the method 800 includes presenting a graphical environment, via the display device, corresponding to XR content, including one or more VAs, composited with an image steam of a physical environment from a first POV. In some implementations, the graphical environment corresponds to a composition of the XR content, including the one or more virtual agents, and an image stream of a physical environment captured from a first point-of-view (POV) of the physical environment. For example, the first POV corresponds to the current position of the computing system (i.e., the user) relative to the physical environment. As shown in FIGS. 6A-6E, the computing system or a component thereof (e.g., the rendering engine 450 and/or the presenter 466 in FIGS. 4A and 4D) presents the XR environment 128. As one example, FIG. 6A illustrates the electronic device 120 presenting an XR environment 128, including XR content 602 (e.g., a 3D cylinder) and VAs 604 and 606, from a first POV (e.g., the POV of the electronic device 120 or the user 150) of the physical environment 105. In some implementations, the one or more VAs correspond to one of a humanoid, an animal, a robot, or the like.

In some implementations, the method 800 includes: obtaining (e.g., receiving, retrieving, capturing, or generating) the image stream associated with the physical environment; (e.g., via a remote source or via the local inputs devices) and generating the graphical environment by compositing the image stream associated with the physical environment with the XR content based on the first POV of the computing system, wherein the XR content includes the one or more virtual agents. In one example, the first POV corresponds to the current position of the computing system (i.e., the user 150) relative to the physical environment 105.

As represented by block 804, the method 800 includes recording a data stream associated with the graphical environment (and components thereof). As shown in FIGS. 4B and 4C, the computing system or a component thereof (e.g., the record manger 470) populates a record 480 that is stored within the record library 475. As shown in FIG. 4C, the record 480 includes a plurality of data streams including the rendered XR content 455 from the POV of the electronic device 120 or the user 150, the processed image stream 463 of the physical environment 105, the composited content 465, and one or more data streams associated with various sensory perceptions from the POV of at least one VA.

As represented by block 806, the method 800 includes detecting, via the one or more input devices, a user input selecting a VA (or a virtual object) within the graphical environment. As shown in FIG. 4A, the computing system or a component thereof (e.g., the content selector 422) detects one or more user inputs 421 and selects XR content or VA(s) 427 from the content library 425 based on one or more user inputs 421 (e.g., a voice command, a selection from a menu of XR content items, and/or the like). As one example, FIGS. 6A-6C illustrate the selection of the VA 606 within the XR environment 128 in order to record one or more data streams from the POV of the VA 606. For example, the user input corresponds to a hand-tracking input, a voice command, an eye tracking input, and/or the like. In some implementations, the user may select two or more VAs to record.

As represented by block 808, in response to detecting the user input, the method 800 includes recording one or more data streams associated a current POV of the selected VA. As one example, in FIG. 6C illustrates the electronic device 120 presenting a text box 632 associated with confirming the recording of the current POV of the VA 606 of the XR environment 128 (e.g., "Recording in progress for the POV of the VA 606.") in response to detecting the user input 622 selecting the VA 606 in FIG. 6B. As one example, the one or more data streams corresponds to different sensory perception modalities of the virtual agent such as infrared perception, optical perception, olfactory perception, auditory perception, and/or the like. As another example, the one or more data streams corresponds to different layers visible to the virtual agent such as an occlusion layer, a mesh layer, a point cloud layer, a texture layer, a skeletal rig layer, and/or the like.

As shown in FIGS. 4B and 4C, the computing system or a component thereof (e.g., the record manger 470) populates a record 480 that is stored within the record library 475. As shown in FIG. 4C, the record 480 includes a plurality of data streams including the rendered XR content 455 from the POV of the electronic device 120 or the user 150, the processed image stream 463 of the physical environment 105, the composited content 465, and one or more data streams associated with various sensory perceptions from the POV of at least one VA. As shown in FIG. 4C, the record 480 includes: environmental data 482 (e.g., ambient audio information, ambient lighting information, and/or the like similar to the environmental information vector 417 in FIG. 4A); one or more data streams associated with a user POV 484 (e.g., the processed image stream 463 of the physical environment 105, the rendered XR content 455, the composited content 465, selected layers, etc.); one or more streams associated with a POV of a first VA referred to herein as VA POV-1 486A (e.g., data streams various sensory perceptions such as sense-1, sense-2, . . . , sense-N); more streams associated with a POV of a second VA referred to herein as VA POV-2 486B (e.g., data streams various sensory perceptions such as sense-1, sense-2, . . . , sense-N); and one or more streams associated with a POV of an N-th VA referred to herein as VA POV-N 486N (e.g., data streams various sensory perceptions such as sense-1, sense-2, . . . , sense-N).

In some implementations, the method 800 includes storing the plurality of data streams locally or on a remote server. As shown in FIG. 4C, the record library 475 includes a plurality of previously recorded instances of the XR environment including at least the record 480. In some implementations, the record library 475 is located local relative to the controller 110 and/or the electronic device 120. In some implementations, the content library 425 is located remote from the controller 110 and/or the electronic device 120 (e.g., at a remote server, a cloud server, or the like).

In some implementations, as represented by block 810, each of the one or more data streams is associated with a different sensory perception of the selected VA. For example, in FIG. 6D, the electronic device 120 presents a menu 642 within the XR environment 128 that includes a plurality of selectable options associated with different senses of the VA 606 that may be toggled on or off such as sense-1 644A, sense-2 644B, sense-N 644N, and all senses 646. For example, the plurality of selectable options within the menu 642 may be selected by various input modalities such as a tap/touch input on the display 122, a hand tracking input, a voice command, or the like.

In some implementations, the one or more data streams of the graphical environment from the current POV of the first virtual agent correspond to a plurality of different sensory perceptions from the current POV of the first virtual agent including at least one of a thermal perception data stream from the current POV of the first virtual agent (e.g., associated with infrared wavelengths), an optical perception data stream from the current POV of the first virtual agent (e.g., associated with visible wavelengths), an auditory perception data stream from the current POV of the first virtual agent, or an olfactory perception data stream from the current POV of the first virtual agent. In some implementations, at least one of the thermal perception, the optical perception, the auditory perception, or the olfactory perception data stream from the current POV of the first virtual agent corresponds to a sensory perception gradient. For example, the sensory perception gradient indicates the strength and/or range of the sensory perception with a color gradient, a texture gradient, and/or the like.

In some implementations, as represented by block 812, the method 800 includes filling data gaps in at least one of the one or more data streams using one or more data extrapolation techniques. As shown in FIG. 4B, the computing system or a component thereof (e.g., the extrapolator 471) fills data gaps in the one or more data streams associated with the various sensory perceptions from the POV(s) of the VA(s). In some implementations, at least one of the thermal perception, the optical perception, the auditory perception, or the olfactory perception data stream from the current POV of the first virtual agent includes data gaps, and wherein the data gaps are filled using one or more data extrapolation techniques.

In some implementations, as represented by block 814, while recording the one or more data streams associated with the POV of the selected VA, the method 800 includes: detecting, via the one or more input devices, one or more toggle inputs enabling/disabling one or more layers; and, in response to detecting the one or more toggle inputs, enabling and/or disabling the one or more layers. As shown in FIG. 4B, the computing system or a component thereof (e.g., the layer handler 474) enables or disables one or more layers based on the unprocessed user inputs 423 toggling the one or more layers. In some implementations, the one or more layers correspond to one of an occlusion layer, a texture map layer, a point cloud layer, a markup layer, a skeletal rigging layer, or an application-specific layer.

For example, in FIG. 6E, the electronic device 120 presents a menu 652 within the XR environment 128 that includes a plurality of selectable options associated with layers that may be toggled on or off such as mesh/point cloud 654A, occlusion 654B, skeletal rig 654C, predicted trajectory 654D, predicted action 654E, markup 654F, application-specific information 654G, other 654H, and all 654I. For example, the plurality of selectable options within the menu 652 may be selected by various input modalities such as a tap/touch input on the display 122, a hand tracking input, a voice command, or the like.

As represented by block 816, the method 800 includes saving a record by time synchronizing the data stream associated with the graphical environment with the one or more data streams associated with the current POV of the selected VA. As shown in FIG. 4B, the computing system or a component thereof (e.g., the time sequencer 472) temporally synchronizes the plurality of data streams associated with the record 480. Furthermore, as shown in FIG. 4B, the computing system or a component thereof (e.g., the record manager 470) stores the record 480 in the record library 475.

In some implementations, as represented by block 818, the method 800 includes: detecting, via the one or more input devices, a subsequent user input directed to instantiating another VA (or virtual object); and, in response to detecting the subsequent user input, instantiating the VA (or virtual object) into the graphical environment. As shown in FIG. 4A, the computing system or a component thereof (e.g., the content selector 422) detects one or more user inputs 421 associated with instantiating VA(s) within the XR environment 128 and instantiates the VA(s) based on one or more user inputs 421. For example, the user input corresponds to a hand-tracking input, a voice command, an eye tracking input, and/or the like.

In some implementations, as represented by block 820, the method 800 includes: detecting, via the one or more input devices, a subsequent user input directed to modifying the XR content; and, in response to detecting the subsequent user input, modifying the XR content (e.g., change appearance, add/subtract components, translate, rotate, etc.). As shown in FIG. 4A, the computing system or a component thereof (e.g., the content selector 422) detects one or more user inputs 421 associated with manipulating XR content or VA(s) within the XR environment 128 and modifies the XR content or VA(s) based on one or more user inputs 421. For example, the user input corresponds to a hand-tracking input, a voice command, an eye tracking input, and/or the like.

Figure 9:
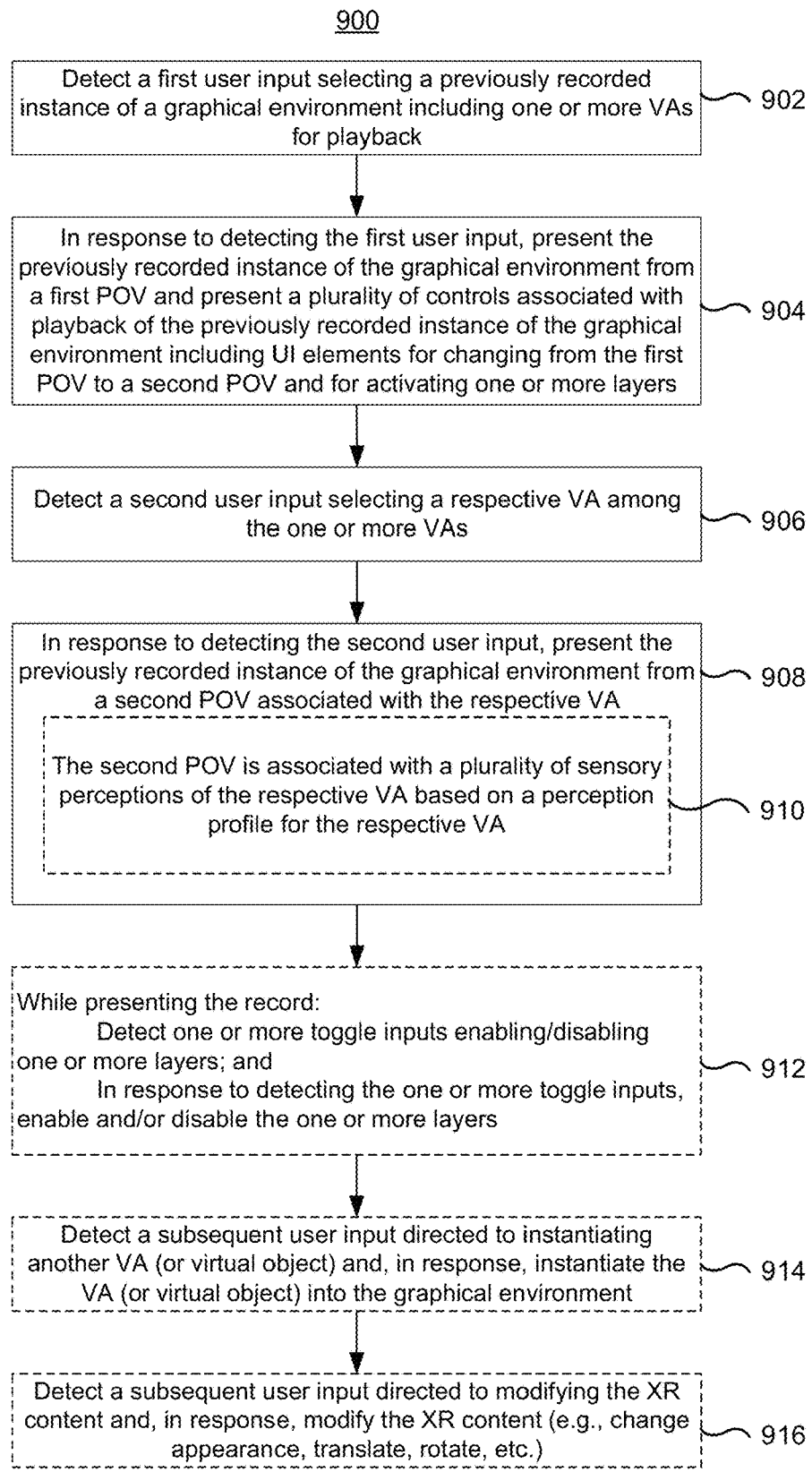
FIG. 9 is another flowchart representation of a method of playing back a record of an XR environment in accordance with some implementations.

FIG. 9 is a flowchart representation of a method 900 of playing back a record of an XR environment in accordance with some implementations. In various implementations, the method 900 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 900 is performed by processing logic, including hardware, firmware, software, or a combination thereof. In some implementations, the method 900 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, an XR experience may be recorded whereby the recorded video data includes a composition of both video pass-through data associated with a scene and XR data. This recorded video data may be insufficient when a developer intends to debug program execution and graphical content playback such as virtual agents (VAs) and/or the XR content. The methods described herein enable improved debugging, development, and general recording for sharing or keepsake purposes by allowing a user to select individual entities within a graphical environment for recordation and playback.

As represented by block 902, the method 900 includes detecting, via the one or more input devices, a first user input selecting a previously recorded instance of a graphical environment including one or more VAs for playback. As one example, in FIG. 7A, the electronic device 120 detects a speech input 716 (e.g., "Please playback record-1.") associated with selecting the option 714A within the menu 712.

In some implementations, the method 900 includes presenting, via the display device, a menu of representations of previously recorded instances, wherein the previously recorded instance of the graphical environment is selected from the menu of representations of previously recorded instances. In FIG. 7A, the menu 712 includes a plurality of selectable options associated with pre-existing records such as record-1 714A, record-2 714B, and record-N 714N. For example, the plurality of selectable options within the menu 712 may be selected by various input modalities such as a tap/touch input on the display 122, a hand tracking input, a voice command, or the like.

In some implementations, the display device corresponds to a transparent lens assembly, and wherein the previously recorded instance of the graphical environment is projected onto the transparent lens assembly. In some implementations, the display device corresponds to a near-eye system, and wherein presenting the previously recorded instance of the graphical environment includes compositing the previously recorded instance of the graphical environment with one or more images of a physical environment captured by an exterior-facing image sensor.

As represented by block 904, in response to detecting the first user input, the method 900 includes presenting, via the display device, the previously recorded instance of the graphical environment from a first POV and presenting a plurality of controls associated with playback of the previously recorded instance of the graphical environment including UI elements for changing from the first POV to a second POV and for activating one or more layers. As one example, in FIG. 7B, the electronic device 120 presents an XR environment 128A associated with a first POV of the record-1 714A and a control menu 722 with a plurality of UI elements for controlling playback such as a temporal scrubber 724, a pause affordance 726A, a play affordance 726B, a volume adjustment affordance 726C, and an options affordance 726N. For example, the plurality of UI elements for controlling playback within the control menu 722 may be controlled by various input modalities such as a tap/touch input on the display 122, a hand tracking input, a voice command, or the like.

In some implementations, the first POV corresponds to one of a neutral observation perspective or a perspective of a user that captured the previously recorded instance of the graphical environment. For example, the neutral observation perspective corresponds to a virtual camera POV that may be translated and/or rotated with six degrees of freedom.

In some implementations, the plurality of controls further includes UI elements for initiating playback, pausing playback, changing playback speed, changing a current playback timestamp, adding markup to the previously recorded instance of the graphical environment, or modifying portions of the previously recorded instance of the graphical environment. For example, the controls may be activated by a hand tracking input, an eye tracking input, a voice command, etc.

As represented by block 906, the method 900 includes detecting, via the one or more input devices, a second user input selecting a respective VA among the one or more VAs. As one example, in FIG. 7D, the electronic device 120 detects, via the body/head pose tracking engine 412, a gestural input with the left hand 151 of the user 150 associated with selecting the VA 606 within the XR environment 128A. In FIG. 7D, the electronic device 120 presents the representation 645 of the left hand 151 of the user 150 within the XR environment 128A.

In some implementations, the first and second user inputs correspond to one of a touch input on the display 122, a hand-tracking input, a voice command, an eye tracking input, or the like. In some implementations, the one or more virtual agents correspond to one of a humanoid, an animal, a robot, or the like.

As represented by block 908, in response to detecting the second user input, the method 900 includes presenting, via the display device, the previously recorded instance of the graphical environment from a second POV associated with the respective VA. In some implementations, the user 150 may hop between a third-person view of the recording and first-person views of various VA POVs. For example, the third-person view may be shown as a picture-in-picture mini-map while viewing the recording from a first-person view of a particular VA. As one example, in FIG. 7F, the electronic device 120 presents an XR environment 128B associated with a second POV of the record-1 714A (e.g., the POV of the VA 606), including the XR content 602 (e.g., the 3D cylinder) and the virtual agent 604, in response to detecting the gestural input selecting the VA 606 in FIG. 7D. In FIG. 7F, the XR environment 128B includes the control menu 722 and a view 762 of the XR environment 128A. One of ordinary skill in the art will appreciate that the picture-in-picture (PIP) nature of the view 762 of the XR environment 128A may be modified or otherwise changed in various other implementations.

In some implementations, the second POV is associated with a plurality of sensory perceptions of the respective VA based on a perception profile for the respective VA. In some implementations, the perception profile includes sensory modalities for the VA, acuity values for the sensory modalities, and range values for the sensory modalities. As one example, an insect VA is associated with a different perception profile with different sensory modalities as compared to a canine VA. As one example, in FIG. 7G, the electronic device 120 presents a menu 772 that includes a plurality of selectable options associated with toggling on or off various sensory modalities of the VA 606 such as sense-1 644A, sense-2 644B, sense-N 644N, and all senses 646.

In some implementations, the plurality of sensory perceptions includes at least one of a thermal perception (e.g., associated with infrared wavelengths), an optical perception (e.g., associated with visible wavelengths), an auditory perception, or an olfactory perception of the graphical environment from the second POV. In some implementations, the graphical environment includes UI elements for toggling the plurality of sensory perceptions.

In some implementations, the second POV is associated with at least two overlapping sensory perceptions of the respective VA based on the perception profile for the respective VA. In some implementations, the at least two overlapping sensory perceptions are associated with visually distinct appearances (e.g., colors, textures, etc.).

In some implementations, the second POV is associated with a first sensory perception of the respective VA based on the perception profile for the respective VA. In some implementations, the first sensory perception corresponds to a non-optical sense that is visualized as a colorized or a texturized vector field. As one example, the colorized vector field highlights or provides a glow for items that the VA dog can smell within the graphical environment. In some implementations, the second POV includes a visualization of at least one of a projected trajectory for the respective VA and actionable items within the graphical environment. For example, the perception profile for the VA includes parameters and acuity values for the various sensory perceptions of the VA.

In some implementations, as represented by block 910, the second POV is associated with a plurality of sensory perceptions of the respective VA based on a perception profile for the respective VA. As one example, in FIG. 7H, the electronic device 120 presents a visualization 782 of a visual sensory perception of the VA 606 based on a perception profile for the VA 606 in response to detecting selection of the sense-1 644A within the menu 772 in FIG. 7G. As another example, the electronic device 120 presents a visualization 792 of an auditory sensory perception of the VA 606 based on a perception profile for the VA 606 in response to detecting selection of the sense-2 644B within the menu 772 in FIG. 7G. As yet another example, the electronic device 120 presents a first visualization 7102 and a second visualization 7104 of an olfactory sensory perception of the VA 606 relative to the VA 604 and the XR content 602, respectively, based on a perception profile for the VA 606 in response to detecting selection of the sense-N 644N within the menu 772 in FIG. 7G.

In some implementations, as represented by block 912, while presenting the record, the method 900 includes: detecting, via the one or more input devices, one or more toggle inputs enabling/disabling one or more layers; and, in response to detecting the one or more toggle inputs, enabling and/or disabling the one or more layers. In some implementations, the graphical environment includes UI elements for toggling one or more layers, and wherein the one or more layers correspond to one of an occlusion layer, a texture map layer, a point cloud layer, a markup layer, a skeletal rigging layer, or an application-specific layer. For example, in FIG. 7C, the electronic device 120 presents a menu 732 associated with toggling various layers in response to detecting the user input 728 in FIG. 7B. In FIG. 7C, the menu 732 includes a plurality of selectable options associated with layers that may be toggled on or off such as mesh/point cloud 654A, occlusion 654B, skeletal rig 654C, predicted trajectory 654D, predicted action 654E, markup 654F, application-specific information 654G, other 654H, and all 654I. For example, the plurality of selectable options within the menu 732 may be selected by various input modalities such as a tap/touch input on the display 122, a hand tracking input, a voice command, or the like. FIGS. 7N-7S illustrate user inputs toggling various layers during playback such as a predicted trajectory 7152 in FIG. 7O and a predicted action 7172 in FIG. 7Q.

In some implementations, as represented by block 914, the method 900 includes: detecting, via the one or more input devices, a subsequent user input directed to instantiating another VA (or virtual object); and, in response to detecting the subsequent user input, instantiating the VA (or virtual object) into the graphical environment.

In some implementations, as represented by block 916, the method 900 includes: detecting, via the one or more input devices, a subsequent user input directed to modifying the XR content; and, in response to detecting the subsequent user input, modifying the XR content (e.g., change appearance, translate, rotate, etc.).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device and one or more input devices:
presenting, via the display device, a graphical environment with one or more virtual agents, wherein the graphical environment corresponds to a composition of extended reality (XR) content, including the one or more virtual agents, and an image stream of a physical environment captured from a first point-of-view (POV) of the physical environment;
detecting, via the one or more input devices, a user input selecting a first virtual agent from among the one or more virtual agents;
in response to detecting the user input, recording a plurality of data streams associated with the graphical environment including a first image stream of the graphical environment from the first POV and one or more data streams of the graphical environment from a current POV of the first virtual agent,
detecting, via the one or more input devices, a subsequent user input that selecting one or more layers associated with the plurality of data streams; and
in response to detecting the subsequent user input, recording the one or more layers for the plurality of data streams, wherein the one or more layers correspond to one of a texture map layer, a point cloud layer, a markup layer, a skeletal rigging layer, or an application-specific layer.

2. The method of claim 1, wherein the one or more data streams of the graphical environment from the current POV of the first virtual agent correspond to a plurality of different sensory perceptions from the current POV of the first virtual agent including at least one of a thermal perception data stream from the current POV of the first virtual agent, an optical perception data stream from the current POV of the first virtual agent, an auditory perception data stream from the current POV of the first virtual agent, or an olfactory perception data stream from the current POV of the first virtual agent.

3. The method of claim 2, wherein at least one of the thermal perception, the optical perception, the auditory perception, or the olfactory perception data stream from the current POV of the first virtual agent includes data gaps, and wherein the data gaps are filled using one or more data extrapolation techniques.

4. The method of claim 2, wherein at least one of the thermal perception, the optical perception, the auditory perception, or the olfactory perception data stream from the current POV of the first virtual agent corresponds to a sensory perception gradient.

5. The method of claim 1, further comprising:
obtaining the image stream associated with the physical environment; and
generating the graphical environment by compositing the image stream associated with the physical environment with the XR content based on the first POV of the computing system, wherein the XR content includes the one or more virtual agents.

6. The method of claim 1, wherein the user input corresponds to one of a touch input, a hand-tracking input, a voice command, or an eye tracking input.

7. The method of claim 1, wherein the one or more virtual agents correspond to one of a humanoid, an animal, or a robot.

8. The method of claim 1, further comprising:
storing the plurality of data streams locally or on a remote server.

9. A device comprising:
one or more processors;
a non-transitory memory;
an interface for communicating with a display device and one or more input devices; and
one or more programs stored in the non-transitory memory, which, when executed by the one or more processors, cause the device to:
present, via the display device, a graphical environment with one or more virtual agents, wherein the graphical environment corresponds to a composition of extended reality (XR) content, including the one or more virtual agents, and an image stream of a physical environment captured from a first point-of-view (POV) of the physical environment;
detect, via the one or more input devices, a user input selecting a first virtual agent from among the one or more virtual agents;
in response to detecting the user input, record a plurality of data streams associated with the graphical environment including a first image stream of the graphical environment from the first POV and one or more data streams of the graphical environment from a current POV of the first virtual agent;
detect, via the one or more input devices, a subsequent user input that selecting one or more layers associated with the plurality of data streams; and
in response to detecting the subsequent user input, record the one or more layers for the plurality of data streams, wherein the one or more layers correspond to one of a texture map layer, a point cloud layer, a markup layer, a skeletal rigging layer, or an application-specific layer.

10. The device of claim 9, wherein the one or more data streams of the graphical environment from the current POV of the first virtual agent correspond to a plurality of different sensory perceptions from the current POV of the first virtual agent including at least one of a thermal perception data stream from the current POV of the first virtual agent, an optical perception data stream from the current POV of the first virtual agent, an auditory perception data stream from the current POV of the first virtual agent, or an olfactory perception data stream from the current POV of the first virtual agent.

11. The device of claim 10, wherein at least one of the thermal perception, the optical perception, the auditory perception, or the olfactory perception data stream from the current POV of the first virtual agent includes data gaps, and wherein the data gaps are filled using one or more data extrapolation techniques.

12. The device of claim 10, wherein at least one of the thermal perception, the optical perception, the auditory perception, or the olfactory perception data stream from the current POV of the first virtual agent corresponds to a sensory perception gradient.

13. A non-transitory memory storing one or more programs, which, when executed by one or more processors of a device with an interface for communicating with a display device and one or more input devices, cause the device to:
present, via the display device, a graphical environment with one or more virtual agents, wherein the graphical environment corresponds to a composition of extended reality (XR) content, including the one or more virtual agents, and an image stream of a physical environment captured from a first point-of-view (POV) of the physical environment;
detect, via the one or more input devices, a user input selecting a first virtual agent from among the one or more virtual agents;
in response to detecting the user input, record a plurality of data streams associated with the graphical environment including a first image stream of the graphical environment from the first POV and one or more data streams of the graphical environment from a current POV of the first virtual agent;
detect, via the one or more input devices, a subsequent user input that selecting one or more layers associated with the plurality of data streams; and
in response to detecting the subsequent user input, record the one or more layers for the plurality of data streams, wherein the one or more layers correspond to one of a texture map layer, a point cloud layer, a markup layer, a skeletal rigging layer, or an application-specific layer.

14. The non-transitory memory of claim 13, wherein the one or more data streams of the graphical environment from the current POV of the first virtual agent correspond to a plurality of different sensory perceptions from the current POV of the first virtual agent including at least one of a thermal perception data stream from the current POV of the first virtual agent, an optical perception data stream from the current POV of the first virtual agent, an auditory perception data stream from the current POV of the first virtual agent, or an olfactory perception data stream from the current POV of the first virtual agent.

15. The non-transitory memory of claim 14, wherein at least one of the thermal perception, the optical perception, the auditory perception, or the olfactory perception data stream from the current POV of the first virtual agent includes data gaps, and wherein the data gaps are filled using one or more data extrapolation techniques.

16. The non-transitory memory of claim 14, wherein at least one of the thermal perception, the optical perception, the auditory perception, or the olfactory perception data stream from the current POV of the first virtual agent corresponds to a sensory perception gradient.

17. The device of claim 9, wherein the one or more programs further cause the device to:
obtain the image stream associated with the physical environment; and
generate the graphical environment by compositing the image stream associated with the physical environment with the XR content based on the first POV of the computing system, wherein the XR content includes the one or more virtual agents.

18. The device of claim 9, wherein the user input corresponds to one of a touch input, a hand-tracking input, a voice command, or an eye tracking input.

19. The device of claim 9, wherein the one or more virtual agents correspond to one of a humanoid, an animal, or a robot.

20. The non-transitory memory of claim 13, wherein the one or more programs further cause the device to:
- obtain the image stream associated with the physical environment; and
- generate the graphical environment by compositing the image stream associated with the physical environment with the XR content based on the first POV of the computing system, wherein the XR content includes the one or more virtual agents.

21. The non-transitory memory of claim 13, wherein the user input corresponds to one of a touch input, a hand-tracking input, a voice command, or an eye tracking input.

22. The non-transitory memory of claim 13, wherein the one or more virtual agents correspond to one of a humanoid, an animal, or a robot.

\* \* \* \* \*